（12）United States Patent
Sano et al.

(10) Patent No.: US 8,847,789 B2
(45) Date of Patent: Sep. 30, 2014

(54) INFORMATION PROVISION SYSTEM, INFORMATION PROVISION DEVICE, INFORMATION PROVISION METHOD, TERMINAL DEVICE, AND DISPLAY METHOD

(75) Inventors: Akane Sano, Tokyo (JP); Masamichi Asukai, Kanagawa (JP); Taiji Ito, Kanagawa (JP); Akinobu Sugino, Kanagawa (JP); Yoshiteru Kamatani, Kanagawa (JP); Kazunori Hayashi, Tokyo (JP); Takayasu Kon, Tokyo (JP); Yasunori Kamada, Kanagawa (JP); Mitsuru Takehara, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1089 days.

(21) Appl. No.: 12/248,151

(22) Filed: Oct. 9, 2008

(65) Prior Publication Data

US 2009/0115617 A1    May 7, 2009

(30) Foreign Application Priority Data

Oct. 17, 2007  (JP) ................................. 2007-270393

(51) Int. Cl.
*G08G 1/095* (2006.01)
*G08B 23/00* (2006.01)
(Continued)

(52) U.S. Cl.
CPC .......... *G09B 29/007* (2013.01); *H04L 65/4038* (2013.01); *G06K 9/00771* (2013.01);
(Continued)

(58) Field of Classification Search
CPC ........... G06K 9/00778; G06K 9/00771; G08B 13/1961; G08B 13/19682; G08B 13/19608; G08B 13/19613; H04L 65/4038

USPC ................ 340/573.1, 995, 691.6, 907, 691.3, 340/686.1, 286.01, 995.1; 348/135, 153; 701/202, 200, 400, 434, 409, 414; 382/103, 115; 455/457, 456.41

See application file for complete search history.

(56) References Cited

U.S. PATENT DOCUMENTS 7,130,743 B2 * 10/2006 Kudo et al. .................... 701/424
2002/0167408 A1 * 11/2002 Trajkovic et al. .......... 340/573.1
(Continued)

FOREIGN PATENT DOCUMENTS

JP    2000-322402 A    11/2000
JP    2003-030373 A    1/2003
(Continued)

*Primary Examiner* — Hoi Lau
(74) *Attorney, Agent, or Firm* — Wolf, Greenfield & Sacks, P.C.

(57) ABSTRACT

An information provision system includes a terminal device, and an information provision device that can communicate with the terminal device. The information provision device includes a communicating section configured to communicate with the terminal device, a head count information managing section configured to manage current head count information for each position, and a crowd information generating section configured to determine a position for making a notification display based on the managed head count information, and generate crowd information containing information of the determined position, and a transmission control section configured to transmit the generated crowd information from the communicating section to the terminal device. The terminal device includes a communicating section configured to communicate with the information provision device, and a control section configured to execute display of a map image on a display section, and execute a display based on the transmitted crowd information on the map image.

33 Claims, 23 Drawing Sheets

(51) Int. Cl.
*G09B 29/00* (2006.01)
*H04L 29/06* (2006.01)
*G06K 9/00* (2006.01)
*G08B 13/196* (2006.01)
*G06F 17/30* (2006.01)
*G06Q 30/02* (2012.01)
*G09B 29/10* (2006.01)
*G09G 5/00* (2006.01)

(52) U.S. Cl.
CPC ........ *G06K 9/00778* (2013.01); *G08B 13/1961* (2013.01); *G08B 13/19613* (2013.01); *G08B 13/19682* (2013.01); *G08B 13/19608* (2013.01); *G06F 17/30241* (2013.01); *G06F 17/30867* (2013.01); *G06Q 30/02* (2013.01); *G09B 29/106* (2013.01); *G09G 5/00* (2013.01)
USPC ..................... 340/907; 340/573.1; 340/686.1; 340/995.1; 340/691.6; 382/115; 382/103; 701/434; 701/414; 348/153

(56) References Cited

U.S. PATENT DOCUMENTS

| | | | |
|---|---|---|---|
| 2004/0203633 A1* | 10/2004 | Knauerhase et al. | 455/414.1 |
| 2005/0025341 A1* | 2/2005 | Gonzalez-Banos et al. | 382/103 |
| 2005/0144049 A1* | 6/2005 | Kuzunuki et al. | 705/6 |
| 2007/0085682 A1* | 4/2007 | Murofushi et al. | 340/572.1 |
| 2007/0103292 A1* | 5/2007 | Burkley et al. | 340/539.13 |
| 2007/0142065 A1* | 6/2007 | Richey et al. | 455/457 |
| 2007/0299776 A1* | 12/2007 | Frustaci et al. | 705/50 |
| 2009/0023457 A1* | 1/2009 | Buer et al. | 455/456.1 |

FOREIGN PATENT DOCUMENTS

| | | |
|---|---|---|
| JP | 2003-288663 A | 10/2003 |
| JP | 2004-288120 A | 10/2004 |
| JP | 2005-286657 A | 10/2005 |
| JP | 2007-011391 | 1/2007 |
| JP | 2007-114988 A | 5/2007 |
| WO | WO 2004/075137 A1 | 9/2004 |

* cited by examiner

FIG. 7A

| POSITION | CURRENT HEAD COUNT | USER ID |
|---|---|---|
| P1 | 8 | UID1, UID5, UID15, UID20 UID98, UID36, UID7, UID41 |
| P2 | 0 | — |
| P3 | 2 | UID17, UID153 |
| ⋮ | ⋮ | ⋮ |

FIG. 7B

| POSITION | CURRENT HEAD COUNT | USER ID | HEAD COUNT AS OF x MINUTES AGO | HEAD COUNT AS OF 2x MINUTES AGO | HEAD COUNT AS OF 3x MINUTES AGO |
|---|---|---|---|---|---|
| P1 | 8 | UID1, UID5, UID15, UID20 UID98, UID36, UID7, UID41 | 5 | 3 | 1 |
| P2 | 0 | — | 1 | 0 | 2 |
| P3 | 2 | UID17, UID153 | 5 | 15 | 20 |
| ⋮ | ⋮ | ⋮ | ⋮ | ⋮ | ⋮ |

FIG. 8

| USER ID | ATTRIBUTE REGISTRATION INFORMATION | | | LATEST UPDATED INFORMATION | | | | |
|---|---|---|---|---|---|---|---|---|
| | AGE | SEX | PREFERENCE/ HOBBY | DATE AND TIME | POSITION | BIOMETRIC INFORMATION | MOTION INFORMATION | STAY TIME |
| UID1 | 18 | M | (UPD) | (TM) | P3 | (BD) | (PD) | (STM) |
| UID2 | 25 | F | (UPD) | (TM) | P1 | (BD) | (PD) | (STM) |
| UID3 | 45 | F | (UPD) | (TM) | P10 | (BD) | (PD) | (STM) |
| ... | ... | ... | ... | ... | ... | ... | ... | ... |

FIG. 9

| POSITION | POSITION ATTRIBUTE | AVERAGE CROWD LEVEL | CROWD INEVITABILITY LEVEL | POSITION-ASSOCIATED SERVICE DATA |
|---|---|---|---|---|
| P1 | (ZD) | LV3 | LV1 | (PSD) |
| P2 | (ZD) | LV1 | LV10 | (PSD) |
| P3 | (ZD) | LV5 | LV6 | (PSD) |
| ... | ... | ... | ... | ... |

FIG. 11A

| CURRENT CONDITION INFORMATION HEADER | USER ID | DATE AND TIME INFORMATION | POSITION INFORMATION |
|---|---|---|---|

FIG. 11B

| CURRENT CONDITION INFORMATION HEADER | USER ID | DATE AND TIME INFORMATION | POSITION INFORMATION | BIOMETRIC INFORMATION | MOTION INFORMATION |
|---|---|---|---|---|---|

FIG. 11C

| CURRENT CONDITION INFORMATION HEADER | USER ID | DATE AND TIME INFORMATION | POSITION INFORMATION | BIOMETRIC INFORMATION |
|---|---|---|---|---|

FIG. 11D

| CURRENT CONDITION INFORMATION HEADER | USER ID | DATE AND TIME INFORMATION | POSITION INFORMATION | MOTION INFORMATION |
|---|---|---|---|---|

FIG. 17
FIG. 17A
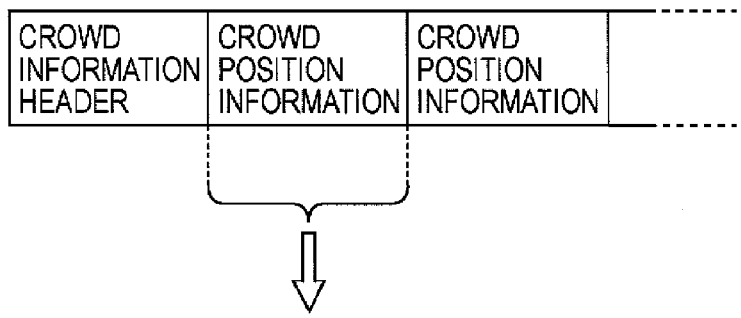
FIG. 17B
FIG. 17C
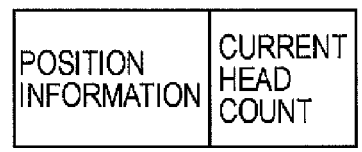
FIG. 17D
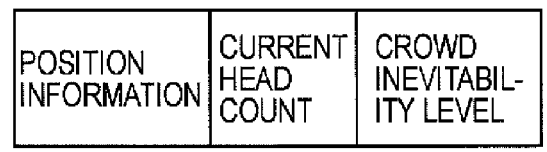
FIG. 17E
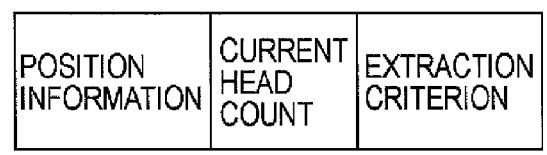
FIG. 17F
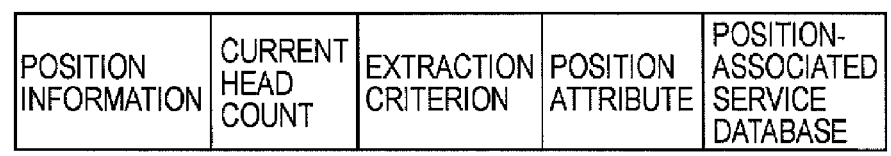

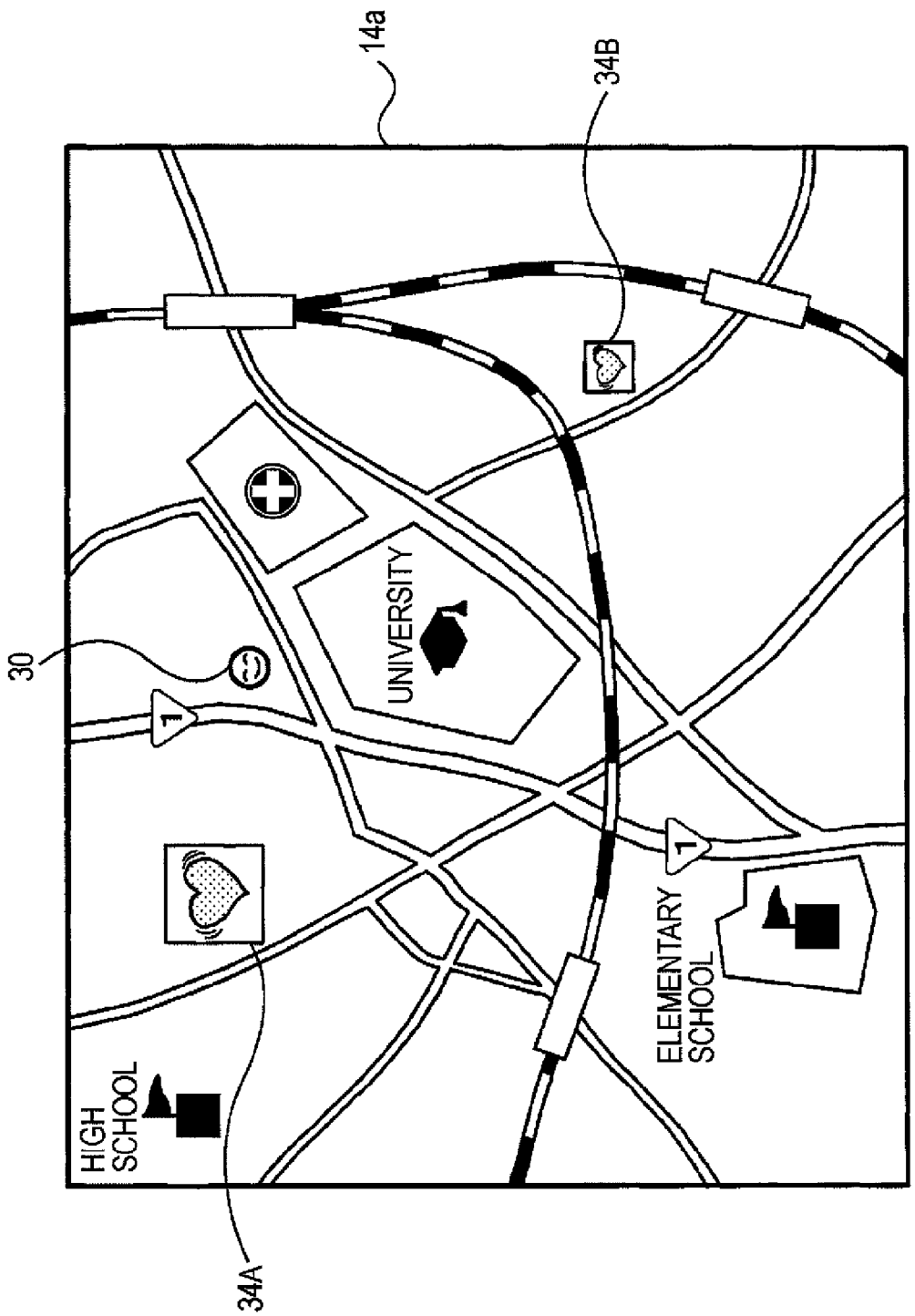

INFORMATION PROVISION SYSTEM, INFORMATION PROVISION DEVICE, INFORMATION PROVISION METHOD, TERMINAL DEVICE, AND DISPLAY METHOD

CROSS REFERENCES TO RELATED APPLICATIONS

The present invention contains subject matter related to Japanese Patent Application JP 2007-270393 filed in the Japanese Patent Office on Oct. 17, 2007, the entire contents of which are incorporated herein by reference.

BACKGROUND OF THE INVENTION

1. Field of the Invention

The present invention relates to an information provision system, an information provision device, an information provision method, a terminal device, and a display method. More specifically, the present invention relates to a technique that makes it possible to provide information about the gathering condition of people.

2. Description of the Related Art

Japanese Unexamined Patent Application Publication No. 2007-11391 discloses a map creation system which extracts subjective information about a user and maps the extracted information onto a map.

In this system, different kinds of electronic information resulting from user's actions are collectively captured as action information, such action information is collected and accumulated together with position information, and subjective information of an actor related to a location is extracted from the action information, and the subjective information is mapped onto an existing objective map, thereby creating a map made up of subjective information of people acting in the real world, which is highly subjective and informative and is not found in the related art.

SUMMARY OF THE INVENTION

With technological progress such as advances in communications infrastructure, development of sensor networks, and reductions in weight and increases in capacity of storage devices, it is becoming possible to realize a system which detects, records, or accumulates an action of an general user to provide useful information or advertisement adapted to the action, position, or condition of the user, or to recommend a content so as to match the preferences of the user.

For a general person, when, in particular, an incident that is difficult to know in advance is happening, such as an accidental incident, or an event that is not notified (or widely notified) by an advertisement or the like, if the person can be notified of the occurrence or the possibility of occurrence of such an incident, provision of such information proves useful.

For example, if more people than usual are gathering at a given location, it can be presumed that some fun incident or interesting incident is happening at that location.

It is thus desirable to take notice of a condition in which people are gathering, and provide information of such a condition to the user.

An information provision system according to an embodiment of the present invention includes a terminal device, and an information provision device that can communicate with the terminal device.

The information provision device according to an embodiment of the present invention which constitutes the above-mentioned information provision system includes communicating means for communicating with the terminal device, head count information managing means for managing current head count information for each position, crowd information generating means for determining a position for making a notification display, on the basis of the head count information managed by the head count managing means, and generating crowd information containing information of the position for making a notification display, and transmission control means for causing the crowd information generated by the crowd information generating means to be transmitted from the communicating means to the terminal device.

Further, the terminal device according to an embodiment of the present invention which constitutes the above-mentioned information provision system includes communicating means for communicating with the information provision device, and control means for executing a display of a map image on an integrated or separate display section, and executing on the map image a display based on crowd information transmitted from the information provision device and received by the communicating means.

In the information provision device according to an embodiment of the present invention mentioned above, the communicating means receives current condition information transmitted from an external terminal device and containing at least current position information of the terminal device, and the head count information managing means manages the current head count information at each position by using the received current condition information.

Further, the current condition information also contains identification information on the terminal device side, and the head count information managing means manages information of a person present at each position on the basis of the identification information.

Further, the current condition information further contains biometric information or motion information of a person carrying the terminal device, and the head count information managing means manages the biometric information or the motion information as the information of a person present at each position, together with the identification information.

Further, the head count information managing means manages attribute registration information of a person who uses the terminal device, in association with the identification information.

Further, the head count information managing means manages stay time at a current position in association with the identification information, as the information of a person present at each position.

Further, the crowd information generating means in the information provision device determines the position for making a notification display by determining whether or not a current head count at each position is equal to or more than a predetermined head count, from the head count information managed by the head count information managing means.

Further, when determining whether or not the current head count at each position is equal to or more than a predetermined head count, the crowd information generating means makes the determination while setting a different value of the predetermined head count for each position, to determine the position for making a notification display.

Further, the crowd information generating means determines the position for making a notification display by determining whether or not the current head count at each position as a position within a specific area range is equal to or more than a predetermined head count.

Further, the crowd information generating means determines the position for making a notification display by determining, as the current head count for each position, a current head count of persons who match a predetermined extraction criterion, and determining whether or not the determined current head count is equal to or more than a predetermined head count. The extraction criterion includes at least one of person's attribute registration information, biometric information, motion information, and stay time.

Further, the crowd information generating means determines the position for making a notification display on the basis of a position where a current head count is equal to or more than a predetermined head count, and in accordance with distribution of attribute information of persons present.

Further, the crowd information generating means in the information provision device determines the position for making a notification display by determining whether or not an amount of change in head count at each position is equal to or more than a predetermined amount of change, from the head count information managed by the head count information managing means.

Further, when determining whether or not the amount of change in current head count at each position is equal to or more than a predetermined head count, the crowd information generating means makes the determination by setting a different value of the reference amount of change for each position, to determine the position for making a notification display.

Further, the crowd information generating means determines the position for making a notification display by determining whether or not the amount of change in current head count at each position as a position within a specific area range is equal to or more than a reference amount of change.

Further, the crowd information generating means determines the position for making a notification display by determining a current head count of persons who match a predetermined extraction criterion at each position, and determining whether or not an amount of change in the determined current head count is equal to or more than a reference amount of change. The extraction criterion includes at least one of person's attribute registration information, biometric information, motion information, and stay time.

Further, the crowd information generating means determines the position for making a notification display on the basis of a position where an amount of change in head count is equal to or more than a reference amount of change, and in accordance with distribution of attribute information of persons present.

Further, the crowd information generating means generates crowd information containing information of a position determined as the position for making a notification display, and information of a current head count or an amount of change in head count at the position.

Further, the crowd information generating means generates crowd information containing information of a position determined as the position for making a notification display, and information of an extraction criterion used when determining the position.

Further, the crowd information generating means generates crowd information containing information of a position determined as the position for making a notification display, and additional information for the determined position.

Further, the transmission control means causes the crowd information generated by the crowd information generating means to be transmitted from the communicating means to the terminal device, in response to reception of request information from the external terminal device.

Alternatively, the transmission control means causes the crowd information generated by the crowd information generating means to be transmitted from the communicating means to the terminal device, at transmission timing according to a change in head count condition.

An information provision method according to an embodiment of the present invention includes the steps of managing current head count information for each position, determining a position for making a notification display, on the basis of the managed head count information, and generating crowd information containing information of the position for making a notification display, and transmitting the generated crowd information to an external terminal device.

In the terminal device according to an embodiment of the present invention mentioned above, the crowd information to be received contains the position information of a position for making a notification display, and information of a current head count or an amount of change in head count at the position, and the control means executes, as the display based on the crowd information, a display that varies in accordance with the current head count or the amount of change in head count, at a position on the map image corresponding to the position information.

Further, the crowd information contains the position information of a position for making a notification display, and information of an extraction criterion used when determining the position, and the control means executes, as the display based on the crowd information, a display that varies in accordance with the extraction criterion, at a position on the map image corresponding to the position information.

Further, the crowd information contains the position information of a position for making a notification display, and additional information with respect to the position, and the control means executes a display based on the additional information as the display based on the crowd information, at a position on the map image corresponding to the position information.

A display method according to an embodiment of the present invention relates to a display method for a terminal device that can communicate with an external information provision device, including the steps of receiving crowd information containing position information of a position for making a notification display, from the information provision device, and executing a display of a map image on an integrated or separate display section and executing a display based on the received crowd information of the map image.

According to an embodiment of the present invention, on the information provision device side, how many people are gathering at each position (location) is detected and managed. Then, a position (location) where the number of people currently present is equal to or more than a predetermined head count, or where the amount of change in head count is equal to or more than a predetermined reference amount of change is determined, and information of that position is provided to the terminal device as crowd information. On the terminal device side, a display based on the crowd information is made. For example, on a map image, a display indicating gathering of people is made at a position where people are gathering. Thus, the user of the terminal device is able to know that some incident is happening at that location.

According to an embodiment of the present invention, the user of the terminal device is able to know an incident, an event, or the like that the user would not normally be able to know unless he/she were on the scene, as information indicating a position where people are gathering. This makes it possible to provide very useful information to the user.

Further, a display that expresses not simply a gathering of people but also information such as what kinds of people are gathering, about how many people are gathering, and the like is made, which also proves suitable for the user to judge whether or not an incident that is happening at that location is of interest to the user. It is thus possible to provide appropriate information to the user.

BRIEF DESCRIPTION OF THE DRAWINGS

FIGS. 7A and 7B are explanatory diagrams of a head count management database according to an embodiment of the present invention;

FIG. 8 is an explanatory diagram of a registered user database according to an embodiment of the present invention;

FIG. 9 is an explanatory diagram of a position management database according to an embodiment of the present invention;

FIGS. 11A to 11D are explanatory diagrams of the structure of current condition information according to an embodiment of the present invention;

FIGS. 17A to 17F are explanatory diagrams of the structure of crowd information according to an embodiment of the present invention;

FIG. 23 is an explanatory view of a display example of crowd marks based on crowd inevitability levels according to an embodiment of the present invention.

DESCRIPTION OF THE PREFERRED EMBODIMENTS

Hereinbelow, an embodiment of the present invention will be described. The description will be given in the following order of topics.
[1. System Configuration]
[2. Terminal Device Configuration]
[3. Server Device Configuration]
[4. Transmission of Current Condition Information from Terminal Device to Server Device]
[5. Determination of Head Count Transition in Server Device]
[6. Operation Example I for Display of Crowd Information]
[7. Operation Example II for Display of Crowd Information]
[8. Operation Example III for Display of Crowd Information]
[9. Example of Filtering Process by Extraction Criterion]
[10. Display Examples]
[11. Effect of Embodiment and Modifications]

1. System Configuration

Figure 1:
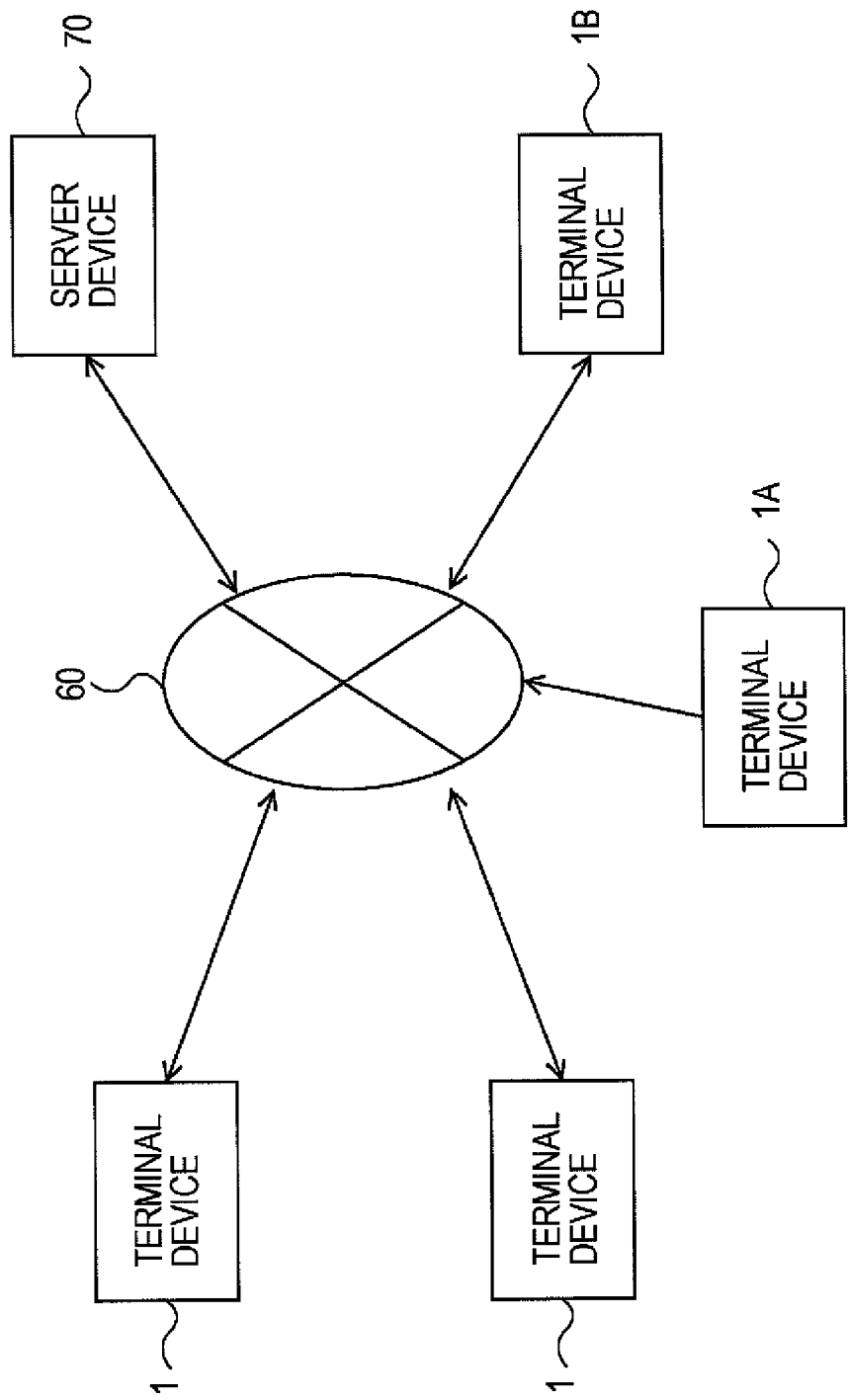
FIG. 1 is an explanatory diagram of an example of a system configuration according to an embodiment of the present invention.

FIG. 1 shows an example of a system configuration according to this embodiment.

A system of this embodiment includes terminal devices 1, 1A, 1B, and a server device 70 (information provision device) that can communicate with each other via a network 60.

The terminal devices 1, 1A, 1B are devices carried by users, for example, mobile equipment.

The system of this embodiment assumes that a large number of users individually carry the terminal devices 1, for example. Information on the current position of each user is transmitted to the server device 70 from each of the terminal devices 1, so the server device 70 thus manages the current positions of a large number of users. Then, the server device 70 determines a "location where people are gathering".

Once the server device 70 transmits information on the "location where people are gathering" as crowd information to the terminal device 1, on the terminal device 1 side, a notification display based on the crowd information is made. For example, a display indicating the location where people are gathering is made on a map image being displayed.

Through this operation, the user of the terminal device 1 is able to know the location where people are gathering.

To realize such a system operation, the terminal device 1 transmits at least current position information to the server device 70 regularly, for example, as current condition information. Depending on the case, the terminal device 1 also transmits biometric information or motion information together with position information.

Also, the terminal device 1 can notify the user of crowd information by receiving crowd information from the server device 70, and making a display based on the crowd information. Crowd information basically refers to information indicating that a large number of people are gathering at a given position (location). On the basis of the crowd information, the terminal device 1 makes such a display as to indicate a location whether many people are gathering on a map image.

Basically, a system made up of the terminal device 1 and the server device 70 may be assumed as this embodiment. However, as a terminal for the system, equipment configured as the terminal device 1A that is used simply for management of the crowd condition by the server device 70, or the terminal device 1B that does not contribute to management of the crowd condition but can receive an information provision service is also conceivable. Thus, the terminal devices 1A, 1B are illustrated as well.

The terminal device 1A is configured as equipment that performs an operation of transmitting current condition information containing current position information to the server device 70 but does not have the function of receiving crowd information from the server device 70 and making a display based on the crowd information.

Also, the terminal device B is configured as equipment that has the function of receiving crowd information from the server device 70 and making a display based on the crowd information but does not particularly transmit current condition information to the server device 70.

An example of the configuration of each terminal device 1, 1A, 1B will be described later.

The terminal device 1, 1A, 1B may be configured as equipment having a shape and size suitable for mobile use and carried about by the user, such as a mobile telephone, a PDA (Personal Digital Assistant), or a small personal computer. Further, the function of the terminal device 1, 1A, 1B may be provided as a built-in function of a mobile telephone, a PDA, or a personal computer.

Also, the terminal device 1, 1A, 1B may be configured as, for example, a glasses-type, a headset-type, or the like that is worn on the head part of the user, or may be configured as a watch-type, a pendant-type, or the like that is worn by the user.

The terminal device 1A may be configured as equipment of a smaller size, such as card-like equipment or an IC tag.

The terminal device 1B may not necessarily be mobile equipment but may be equipment of a type placed at home or the like by the user, for example, a desktop personal computer. Alternatively, the terminal device 1B may be realized as a built-in function of a desktop personal computer.

The server device 70 serves as an information provision device that provides crowd information to the terminal device 1, 1B.

The server device 70 performs management of current position information transmitted from the terminal device 1, 1A, determines about how many people are gathering at each position, and manages the crowd condition of people at each position. Also, on the basis of the crowd condition management, the server device 70 generates crowd information, and transmits the crowd information to the terminal device 1, 1B.

Various examples of the network 60 are conceivable, such as the Internet, a mobile telephone communication network, a PHS communication network, an ad-hoc network, or LAN.

2. Terminal Device Configuration

An example of the terminal device 1, 1A, 1B will be described below.

Figure 2:
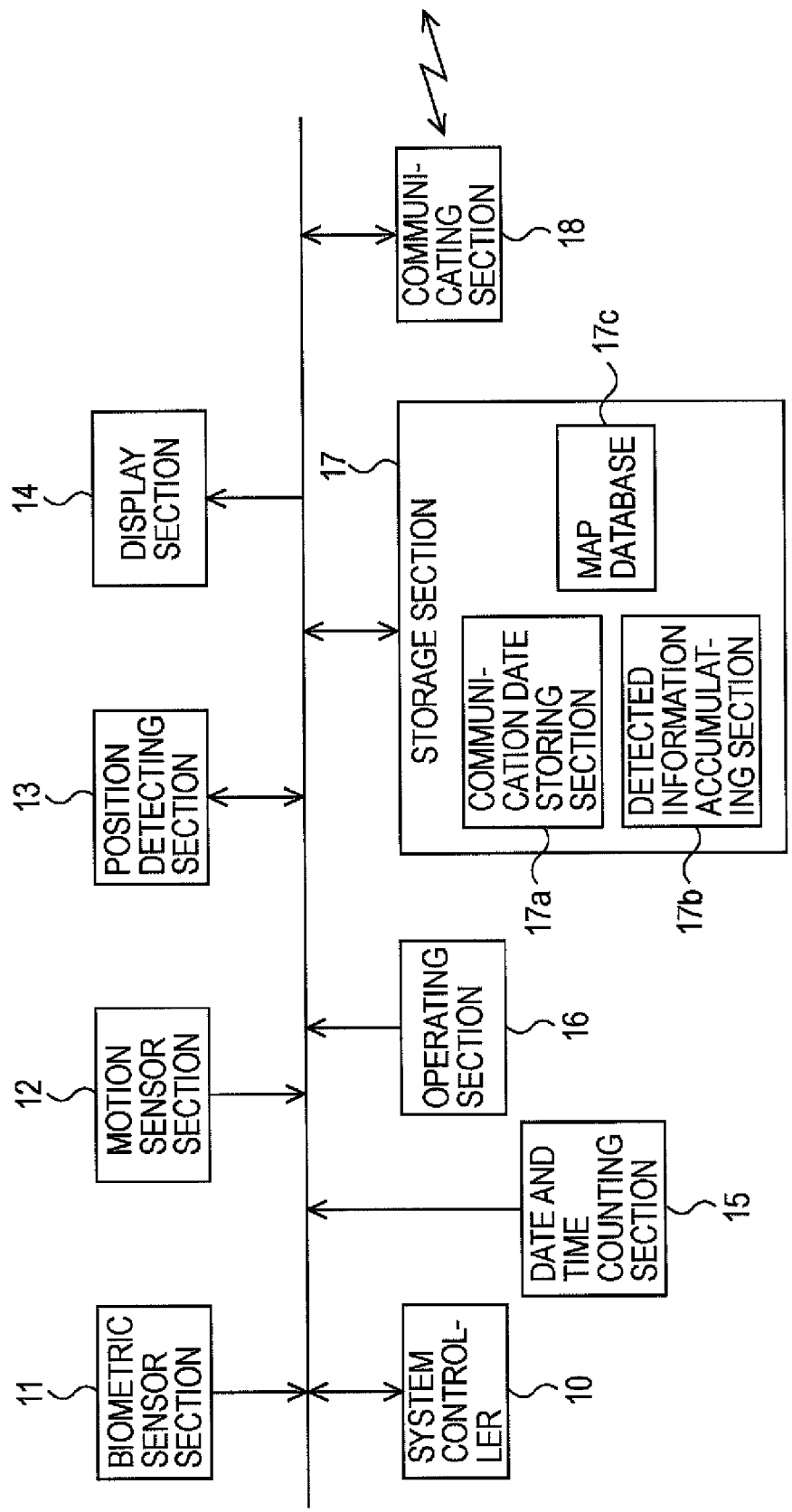
FIG. 2 is a block diagram of a terminal device according to an embodiment of the present invention.

First, FIG. 2 shows an example of the configuration of the terminal device 1.

The terminal device 1 has a system controller 10, a biometric sensor section 11, a motion sensor section 12, a position detecting section 13, a display section 14, a date and time counting section 15, an operating section 16, a storage section 17, and a communicating section 18.

The system controller 10 is configured by a microcomputer including a CPU (Central Processing Unit), a ROM (Read Only Memory), a RAM (Random Access Memory), a non-volatile memory section, and an interface section, for example. The system controller 10 serves as a control section that controls the entire terminal device 1.

The system controller 10 controls individual sections within the terminal device 1 on the basis of an internal operation program, thereby executing necessary communicating operations, display operations based on crowd information, and the like.

The biometric sensor section 11 detects the biometric information of the user. Examples of such biometric information include pulse, heart rate, cardiographic signal, electromyogram, respiration (for example, respiratory speed, depth, and minute ventilation), perspiration, GSR (Galvanic Skin Response), blood pressure, blood oxygen saturation ($SpO_2$), skin surface temperature, brain waves (for example, information of $\alpha$ waves, $\beta$ waves, $\theta$ waves, and $\delta$ waves), blood flow change (blood flow change of a brain blood flow, peripheral blood flow, or the like by near-infrared spectrophotometry), body temperature, and state of the eyes (pupil state, movement of the eyes, blinking, or the like).

For example, to detect GSR (Galvanic Skin Response), body temperature, skin surface temperature, cardiographic response, electromyographic heart rate, pulse, blood flow, blood pressure, brain waves, perspiration, body temperature, and the like, a sensor that touches the skin of a subject may be used. For brain waves, a sensor that is worn on and touches the head part of the subject is used.

A sensor for detecting the state of the user's eyes can be formed by an image capturing section configured to capture the image of the eyes part of the user. In this case, an image analysis is performed with respect to the image of the eyes part of the user captured by the image capturing section, thereby detecting the line-of-sight direction, focal length, amount of opening of the pupils, fundus pattern, and opening and closing of the eye lids, and the like. Alternatively, the sensor may be formed by a light emitting section that radiates light to the eyes part of the user, and a light receiving section that receives light reflected from the eyes part. For example, it is also possible to detect the thickness of the user's crystalline lens from a received signal.

The biometric sensor section 11 outputs desired information on the detection results of these sensors to the system controller 10.

The motion sensor section 12 detects user's motion information. Examples of motion information include information indicating user's states such as still/walking/running, information indicating motion states (vibration, jumping, walking/running rhythm, center of gravity, and the like), and information indicating the movements of user's body elements such as the head, arms, feet, hands, and fingers.

These pieces of motion information can be detected by using an acceleration sensor, a gyro (angular velocity sensor), a vibration sensor, or the like. That is, when an acceleration sensor or a gyro is provided, for example, the movement of the whole body, the movement of the head part, the movement of the neck, the movement of the arm part, the movement of the leg part, and the like can be detected as signals corresponding to movements of the user. Of course, to detect the movement of the arm part, the movement of the leg part, or the like, the acceleration sensor or the gyro may be worn on the user's arm or leg part.

The biometric sensor section 11 outputs information on the detection results of these sensors including the acceleration sensor to the system controller 11.

The position detecting section 13 is configured as, for example, a GPS receiving section. The GPS receiving section receives radio waves from a GPS (Global Positioning System) satellite, and outputs latitude/longitude information as current position information to the system controller 10.

It should be noted that as the position detecting section 13, WiFi (Wireless Fidelity) or a position information service provided by a mobile telephone company may be used.

The date and time counting section 15 constantly perform a date and time counting operation to count year, month, day, hour, minute, and second.

The operating section 16 is provided as an operating member such as a key or dial with which a user using the terminal device 1 performs various operations. A configuration is also possible in which a touch panel is provided on the display section 14, and this is touch-operated as the operating section 16.

For example, the operating section 16 allows a power on/off operation, display-related operations (for example, a display mode selection and a display adjusting operation), various setting operations, and the like.

The system controller 10 performs desired control processes on the basis of operation information from the operating section 16.

Since the terminal device 1 according to this embodiment includes the biometric sensor section 11 and the motion sensor section 12, a user's conscious behavior may be detected from biometric information/motion information detected by these sensor sections, and the system controller 10 may regard this as operation input information.

For example, light tapping of the terminal device 1 by the user may be detected by an acceleration sensor, vibration sensor, or the like of the motion sensor section 12, and this can be recognized by the system controller 10 as an operation of the user.

Also, turning of the head, shaking of the neck, or the like by the user may be detected by an acceleration sensor or angular velocity sensor, and this may be recognized by the system controller 10 as an operation of the user.

Also conceivable is an arrangement in which a movement of the user's eyes is detected by the biometric sensor section 11 and, for example, a movement of the eyes as user's conscious behaviors (line-of-sight direction or blinking) is recognized as an operation input.

The communicating section 18 transmits/receives data to/from external equipment. The communicating section 18 is networked in a wired or wireless manner, and communicates with the server device 70 via the network 60 shown in FIG. 1.

The storage section 17 performs recording (saving) of various data and reproduction (reading) of recorded data on the basis of control of the system controller 10.

The storage section 17 may be configured by a solid-state memory such as a RAM or a flash memory, or may be configured by, for example, an HDD (Hard Disk Drive).

Also, the storage section 17 may not be a built-in recording medium but may be configured as a recording/reproducing drive or the like adapted to a portable recording medium, for example, a recording medium such as a memory card with a built-in solid-state memory, an optical disc, a magneto-optical disc, or a hologram memory.

Of course, both of a built-in type memory such as a solid-state memory or HDD, and a recording/reproducing drive for a portable recording medium may be installed.

In the case of this embodiment, the storage section 17 includes storage areas specifically serving as a communication data storing section 17a, a detected information accumulating section 17b, and a map database 17c.

The communication data storing section 17a is used for buffering or storing of transmitted/received data in the communicating section 18.

The detected information accumulating section 17b stores biometric information detected by the biometric sensor section 11, motion information detected by the motion sensor section 12, and position information detected by the position detecting section 13. On the basis of control of the system controller 10, for example, the detected information accumulating section 17b is configured to store these pieces of information at each fixed time interval, for example, together with date and time information counted by the date and time counting section 15. That is, user's biometric information/motion information/position information is recorded in the detected information accumulating section 17b, and current condition information described later is generated on the basis of this recorded information.

In the map database 17c, a map image for a map display, and other such necessary information are stored.

The display section 14 has, for example, a display panel section such as a liquid crystal panel or an organic EL panel, and a display drive section that drives the display of the display panel section. The display drive section is configured by a pixel drive circuit for displaying supplied image data on the display panel section. The pixel drive circuit applies drive signals based on image signals at predetermined horizontal/vertical drive timings to individual pixels arranged in matrix in the display panel section, thereby executing a display.

The display section 14 causes the display panel section to execute a predetermined display, on the basis of control of the system controller 10. In this embodiment, in particular, by using map image data stored in the map database 17c, the system controller 10 causes the display section 14 to execute a map display, and further to execute a display based on crowd information received from the server device 70, on the displayed map image.

As described above, such a terminal device 1 is preferably configured as equipment that can be worn or carried by the user. In particular, to ensure appropriate detection by the biometric sensor section 11 or the motion sensor section 12, although depending on the contents of biometric information to be detected, the terminal device 1 may be implemented in such conceivable forms as a watch-type, a headset-type, a cap-type, a helmet-type, a glove-type, and a piece of clothing with equipment built therein, particularly those which allow at least a part (the biometric sensor section 11) of the terminal device 1 to touch a section of the body of the subject appropriate for the information to be detected, such as the skin or head part.

Figure 3:
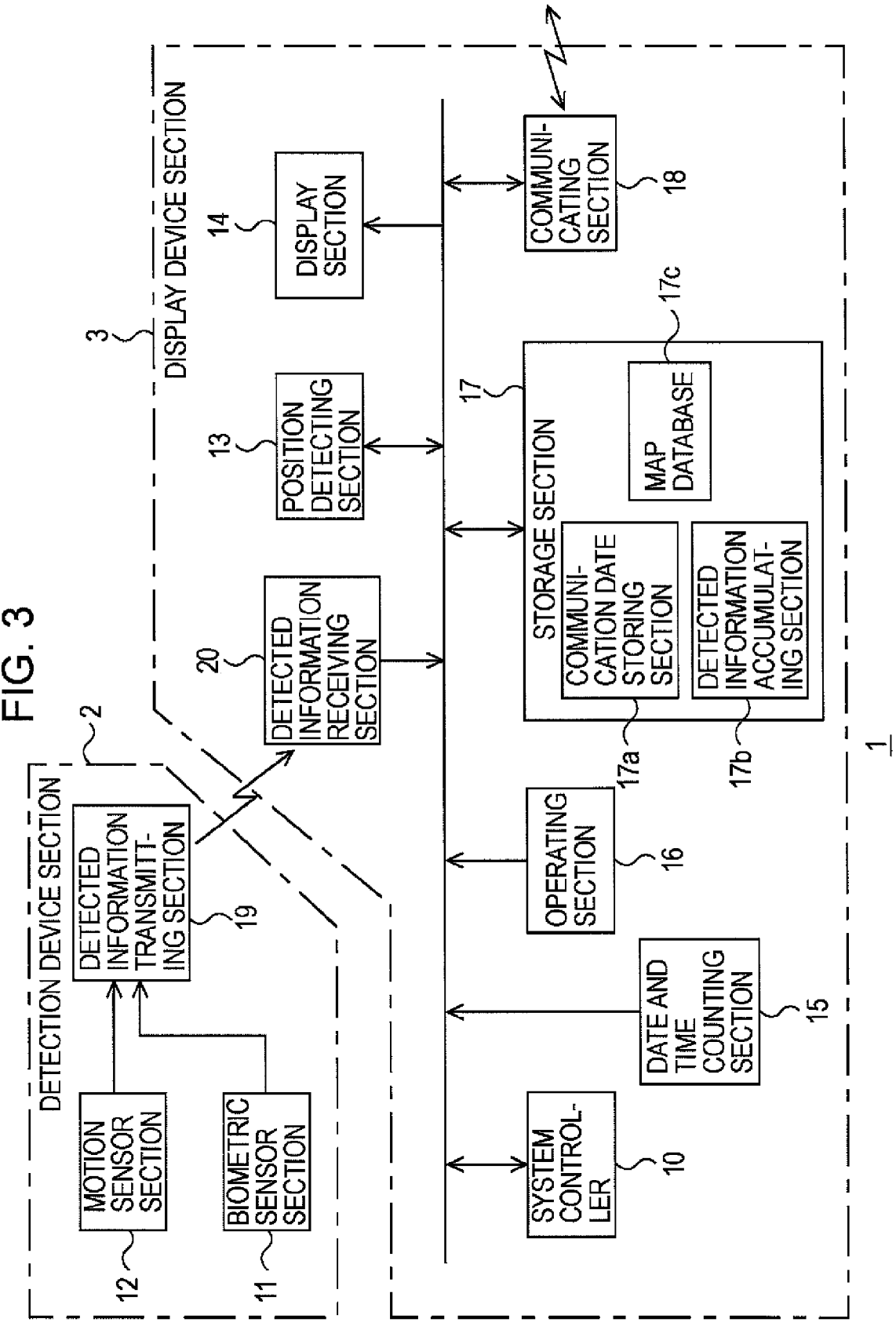
FIG. 3 is a block diagram of a terminal device according to an embodiment of the present invention.

However, since it suffices that at least the biometric sensor section 11 (or the motion sensor section 12 depending on the contents of motion information to be detected) be brought into intimate contact with the body of the user, the terminal device 1 may be formed as two units as shown in FIG. 3.

FIG. 3 shows an example in which the terminal device 1 is configured by separate units, a detection device section 2 and a display device section 3.

The detection device section 2 has the biometric sensor section 11, the motion sensor section 12, and a detected information transmitting section 19.

The display device section 3 includes a detected information receiving section 20, in addition to the system controller 10, the position detecting section 13, the display section 14, the date and time counting section 15, the operating section 16, the storage section 17, and the communicating section 18.

The detected information receiving section 20 and the detected information transmitting section 19 communicate with each other via, for example, wireless or wired communication. In the case of wireless communication, for example, a short-range wireless communication scheme such as the Bluetooth may be employed, or an optical communication scheme that performs data communication by optical pulse modulation using visible light, invisible light, or the like may be employed. Of course, a wireless communication scheme adapted to longer-range communication or network communication may be employed as well.

In the case of the configuration shown in FIG. 3, biometric information detected by the biometric sensor section 11, and motion information detected by the motion sensor section 12 are transmitted from the detected information transmitting section 19, and received by the detected information receiving section 20.

The system controller 10 controls the display of character images on the basis of the biometric information and motion information received by the detected information receiving section 20.

In the case of the configuration shown in FIG. 3, it suffices that only the detection device section 2 can be made to touch a desired section of the user such as the skin or the head part, thereby making it possible to reduce the burden on the user in wearing the terminal device 1. In particular, the detection device section 2 is of a simple configuration having the biometric sensor section 11, the motion sensor section 12, and the detected information transmitting section 19. Hence, the detection device section 2 can be easily reduced in size and weight, thereby facilitating implementation as equipment that can be worn on a desired section of the body.

Although the display device section 3 may be configured as small dedicated equipment carried by the user, an implementation is also possible in which the function as the display device section 3 is added to mobile equipment such as a mobile telephone or a PDA (Personal Digital Assistant).

Figure 4:
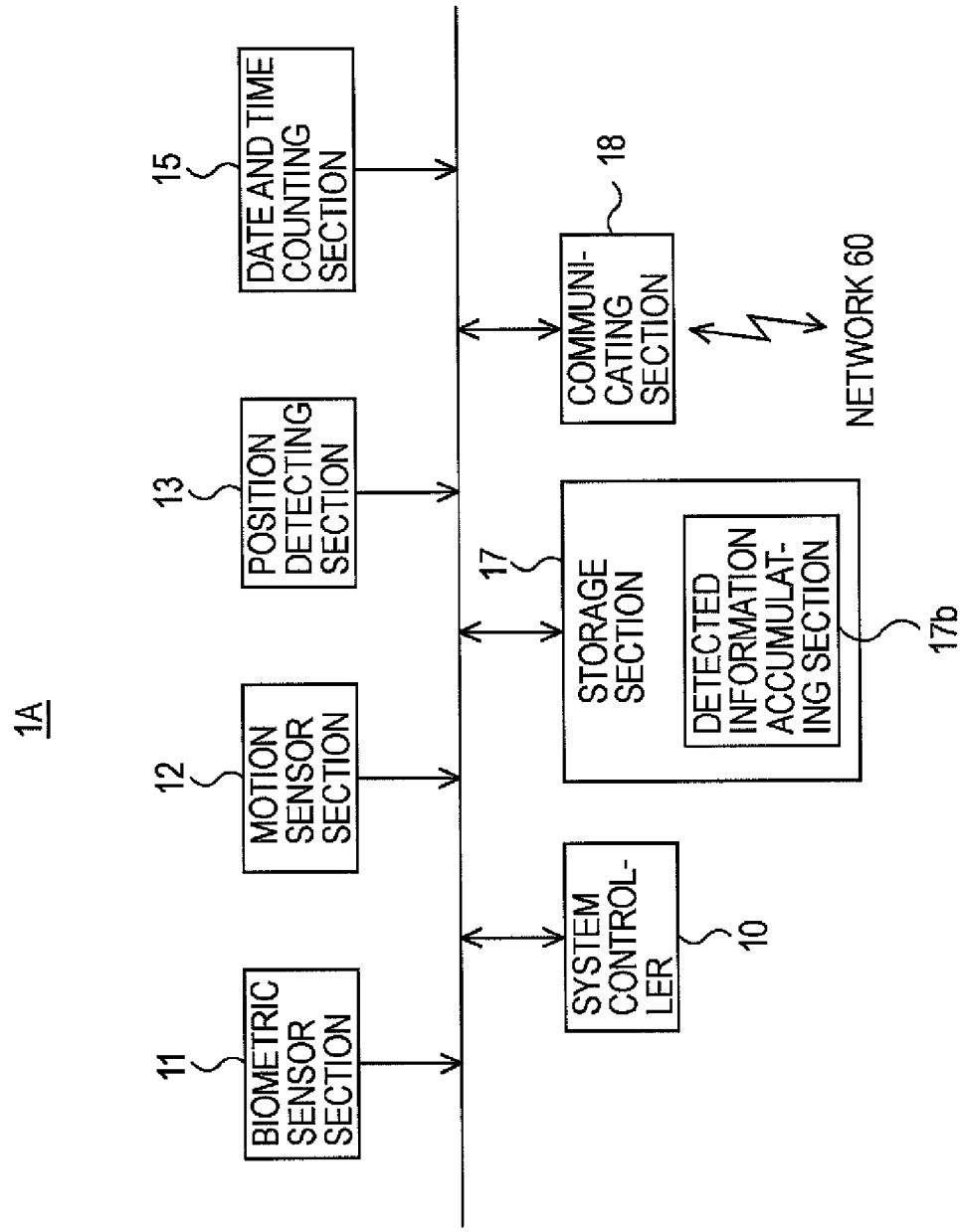
FIG. 4 is a block diagram of a terminal device according to an embodiment of the present invention.

FIG. 4 shows an example of the configuration of the terminal device 1A described above.

The terminal device 1A is equipment that transmits current condition information to the server device 70. As such, the terminal device 1A may have the system controller 10, the biometric sensor section 11, the motion sensor section 12, the position detecting section 13, the date and time counting section 15, the storage section 17, and the communicating section 18.

The storage section 17 may have the detected information accumulating section 17b that stores position information, biometric information, and motion information that are the contents of current condition information.

Figure 5:
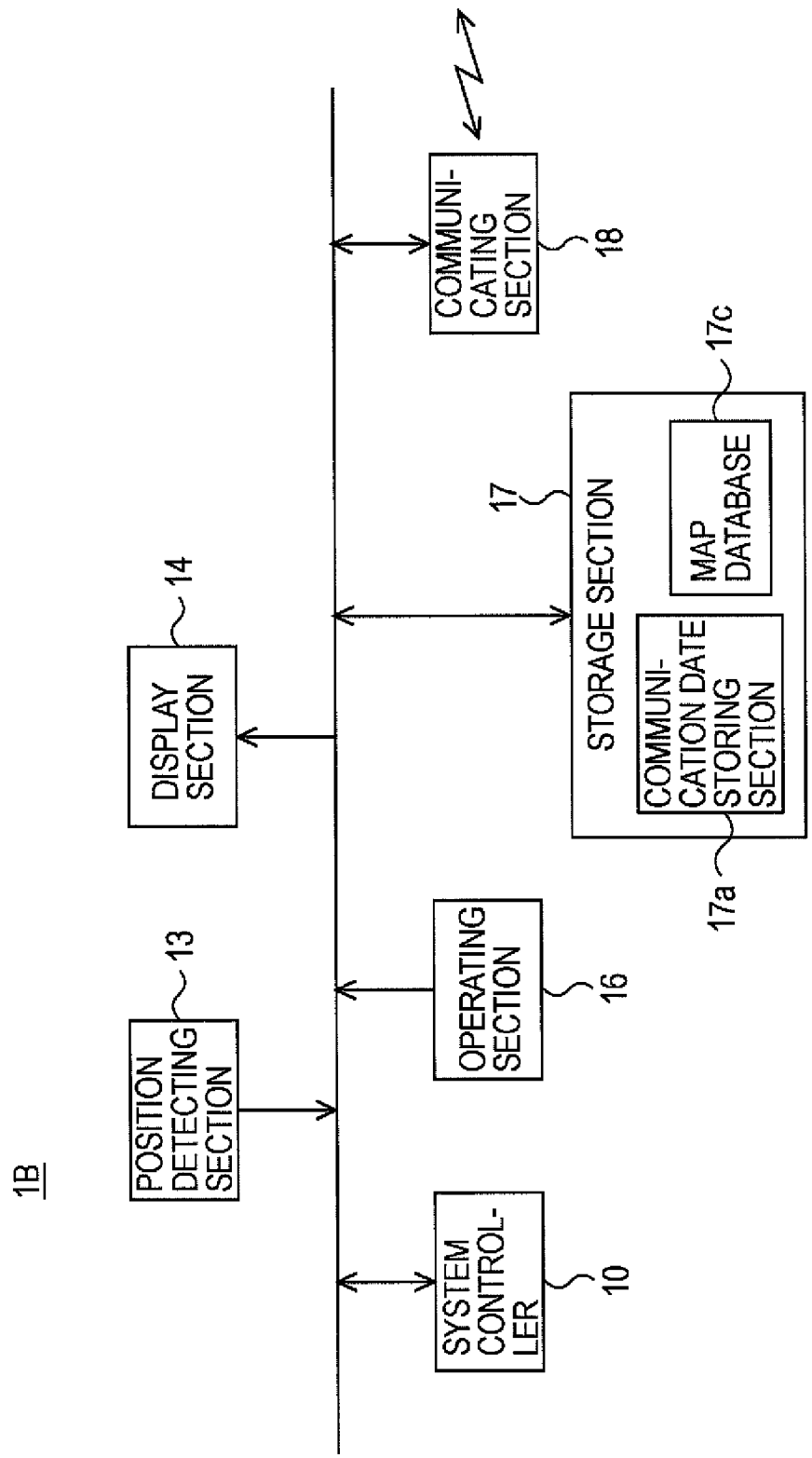
FIG. 5 is a block diagram of a terminal device according to an embodiment of the present invention.

FIG. 5 shows an example of the configuration of the terminal device 1B described above.

The terminal device 1B is equipment that receives crowd information transmitted from the server device 70, and performs a display based on the crowd information. As such, the terminal device 1B may have the system controller 10, the position detecting section 13, the display section 14, the operating section 16, the storage section 17, and the communicating section 18.

The storage section 17 may have a communication data storing section 17a for saving received crowd information, and a map database 17c for a map display.

It should be noted that position detection by the position detecting section 13 is performed for displaying, upon display of a map image, for example, the current self position on that map image.

While configuration examples of the terminal device 1, 1A, 1B have been described above with reference to FIGS. 2, 3, 4, and 5, in actuality, various modifications of these configurations are possible.

That is, it may be understood that respective sections are provided as deemed necessary in accordance with at least various operation examples described later, the structure of data to be communicated, and the like, and various omissions or additions are possible with respect to the configurations illustrated in the respective drawings mentioned above.

For example, the terminal device 1, 1A may be configured so as not to include the biometric sensor 11 and the motion sensor 12.

Also, the map database 17c may not necessarily be provided in the terminal device 1, 1B. While the map database 17c is provided for performing a map display on the display section 14, if, for example, a configuration is adopted in which map drawing data is downloaded from the server device 70 at the time of map display, a map image display can be performed even without providing the map database 17c.

3. Server Device Configuration

Figure 6:
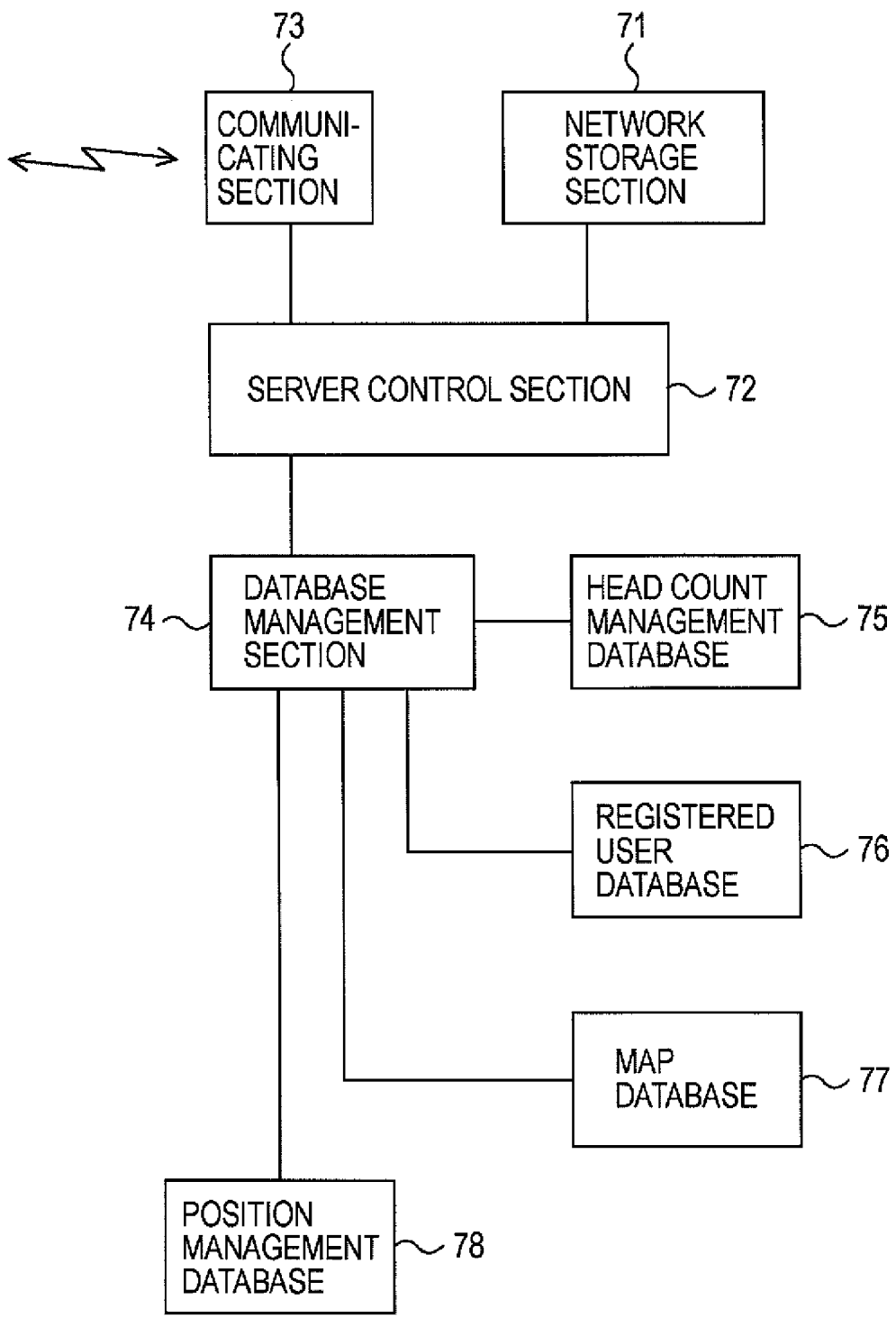
FIG. 6 is a block diagram of a server device according to an embodiment of the present invention.

Next, FIG. 6 shows an example of the configuration of the server device 70.

As described above, the server device 70 is a device which, through communication via the network 60, for example, captures current condition information transmitted from the terminal device 1 (or 1A; hereinafter omitted) to grasp the crowd condition at each position, generates crowd information indicating a location where people are gathering, and transmits the crowd information to the terminal device 1 (or 1B; hereinafter omitted).

The server device 70 includes a server control section 72, a network storage section 71, a communicating section 73, a database management section 74, a head count management database 75, a registered user database 76, a map database 77, and a position management database 78.

The server control section 72 controls operations necessary for the server device 70. In particular, the server control section 72 performs control of network communications, control of processing at the time when current condition information is transmitted from the terminal device 1, control related to the transmission of crowd information to the terminal device 1, and the like.

The network storage section 71 is implemented by, for example, an HDD, and is used for, for example, temporary saving of data transmitted/received through communication with the terminal device 1 via the network 60, saving of various kinds of necessary information, and the like.

The communicating section 73 performs data communications via the network 60 with the terminal device 1.

The database management section 74 performs management of each of the head count management database 75, the registered user database 76, the map database 77, and the position management database 78. That is, the database management section 74 performs update processing, search processing, read processing, and the like with respect to each database.

The head count management database 75 is a database that manages the current head count at each position.

The head count management database 75 is of a structure shown in FIG. 7A, for example. That is, in association with each of positions (P1, P2, P3 . . . ) on a map, the number of people currently present at that position is managed while being constantly updated. Also, as user IDs, pieces of identification information of people currently present are updated and registered.

The positions P1, P2, P3 . . . as the units of management may each be a single position indicated by a latitude/longitude, or may be a position corresponding to a place name or a district name. Further, the positions P1, P2, P3 . . . may each be a position that is set by executing area division on the map.

It suffices as long as a unit of "location" that can be determined by position information detected on the terminal device 1 side is set.

A user ID is identification information that is uniquely set for each user of the terminal device 1. This user ID may be a device ID individually assigned to the terminal device 1.

As will be described later, at least a user ID and current position information are transmitted from the terminal device 1 or 1A as current condition information. On the server device 70 side, the head count management database 75 is updated every time current condition information is received. For example, if a received user ID as current condition information is "UID1", and position information indicates a position corresponding to the position P1, on the head count management database 75, the user ID "UID1" is registered with respect to the position P1. The current head count can be managed as the number of registered user IDs.

FIG. 7B shows another example of the structure of the head count management database 75. While current head counts and user IDs are managed in association with positions (P1, P2, P3 . . . ) as in FIG. 7A, for example, further, to allow management of variations in head count for each unit time of x minutes, the head count as of x minutes ago, the head count as of 2x minutes ago, and the head count as of 3x minutes ago are registered as head count progress information.

By thus also leaving past head counts to some extent as registered information, on the server device 70 side, changes in head count at each position can be grasped.

For example, in the example of FIG. 7B, for the position P1, a condition in which the number of people is gradually increasing can be confirmed. Also, for the position P3, a condition in which the number of people is gradually decreasing can be confirmed.

The registered user database 76 is a database that manages information on users registered for an information provision service according to the system of this embodiment.

An example of the structure of the registered user database 76 is shown in, for example, FIG. 8.

In this example, on the registered user database 76, for example, attribute registration information informed by the user in advance, and the latest updated information indicating the latest condition are registered.

On the registered user database 76, attribute registration information and the latest updated information are registered in association with each individual user identified by a user ID.

First, the attribute registration information refers to information informed by the user in advance for the enjoyment of a service according to the system of this embodiment. For example, by transmitting the attribute registration information from the terminal device 1 at the time of enjoyment of the service, the attribute registration information is registered onto the registered user database 76.

Assumed as the contents of the attribute registration information are age, sex, hobby/preference information UPD, and the like. Conceivable examples of the hobby/preference information UPD include descriptions of hobby genres or the like, such as music, sports, gourmet, and shopping, and descriptions representing further subdivisions of the above descriptions (in the case of music, for example, music genres such as rock and classical).

The latest updated information associated with each user ID refers to information informed as current condition information transmitted from the terminal device 1. That is, the latest updated information is information that is updated every time current condition information is transmitted, and includes, for example, date and time TM, current position, biometric information BD, motion information PD, and stay time STM.

While an example of the contents of current condition information transmitted from the terminal device 1 will be described later with reference to FIGS. 11A to 11D, the current condition information contains at least a user ID, date and time information, and position information. Thus, when current condition information has been transmitted, on the registered user database 76, at least descriptions of the date and time TM and current position are updated. For example, when current condition information for a user ID=UID1 has been transmitted from a given terminal device 1, date and time and position are updated as registration information for the user ID=UID1 on the registered user database 76.

As position information, for example, the same position information as the positions P1, P2 . . . shown in the head count management database 75 in FIGS. 7A and 7B is stored. For example, if position information (latitude/longitude) that has been transmitted as current condition information corresponds to the position P3 on the head count management database 75, "P3" is registered as position information in the latest updated information on the registered user database 76.

Also, if biometric information or motion information is contained in the current condition information, on the registered user database 76, descriptions of the biometric information BD or the motion information PD are also updated.

The latest updated information containing the date and time TM, position, biometric information BD, and motion information PD is used for managing the latest conditions with respect to individual users.

The stay time STM is information indicating the period of time for which a user has been staying at the current location. For example, if the current position of a user with a user ID=UID1 is the position P3 as shown in the drawing, the period of time for which the user has been staying at the position P3 is indicated as the stay time STM.

For example, when updating the latest updated information upon receiving the current condition information, it is checked whether or not there is a change in position information, and if there is no change, the difference in time between the date and time stored up to that point, and the date and time indicated by the current condition information this time is added to the value of the stay time STM stored up to that point, thereby making it possible to compute the stay time at the same position up to the current time. Of course, if the position indicated by the current condition information this time differs from the position stored up to that point, the stay time STM may simply be reset to zero.

With the registered user database 76 as shown in FIG. 8, the server device 70 can manage and grasp such information as attributes (age, sex, and hobby/preference) related to a user of each terminal device 1, and the latest conditions, including where the user is present, in what biometric condition or motion condition, and further how long the user has been staying at the current location, as of the current time (point in time close to the current time).

The map database 77 of the configuration shown in FIG. 6 stores map information with reference to a latitude/longitude. For example, the map database 77 is referenced during the process of associating a latitude/longitude with the position P1, P2, . . . used in the head count management database 75 and the registered user database 76, or at the time of creating the position management database 78 described below.

On the position management database 78, position attribute ZD, average crowd level, crowd inevitability level, and position-associated service data PSD are registered as information with respect to each of the positions P1, P2, ... used in the head count management database 75 and the registered user database 76.

The position attribute ZD indicates an attribute with respect to each position. The position attribute ZD is, for example, a place name, an area name, a road name, or a building/facility name, or the kind type of a building, facility, or location. Assumed as the kind type here in a kind type such as store, stadium, park, farm, or station.

The average crowd level is information indicating about how many people normally gather at that position, as represented by n levels.

For example, the number of people who are present at a position on average differs depending on whether the position corresponds to an area with a large population or a small population, or whether the position corresponds to a residential area or a downtown area. For example, there are an extremely large number of people at all times at a given position Px in a downtown area such as Shinjuku or Shibuya in Tokyo, whereas the average number of people present at a position Py in a downtown area of a provincial city is not so large. Also, in the case of a farming village or the like, there are situations when hardly anyone is present, even at a position Pz in front of a station, for example.

The system of this embodiment provides a service of presenting a location where people are gathering to the user of the terminal device 1. In this regard, to present a "location where people are gathering" to the user as a "location where some interesting incident is happening", it is necessary to extract a location where more people are gathering than usual. For example, provided that an average of about 100 people are present daily at the given position Px in the Shibuya ward, even if a gathering of 100 people is detected, it may be difficult to presume that the position Px indicates a "location where some interesting incident is happening". At such a location, it is appropriate to raise the criterion for determining a "location where some interesting incident is happening" to a larger head count.

On the other hand, hardly anyone is present normally in a meeting place at the position Pz in front of a station in a farming village. Hence, a gathering of about 10 people is enough to presume that some incident is happening at that position.

In this way, when determining whether or not more people than usual are gathering at a location whether people are gathering, it is appropriate to make the determination with reference to the average number of people who are normally present.

Accordingly, the average number of people present in normal situations is set and managed as the average crowd level on the position management database, and the determination as to whether or not people are gathering is made in accordance with the level.

The crowd inevitability level is set and registered as a level indicating whether people frequently gather at a location in question.

The system according to this embodiment places more emphasis on providing information about a location where an accidental incident seems to have occurred, than providing information about an event or the like that is planned and publicly advertised in advance.

For example, when an athletic event is being held in a sports stadium, or when a performance is being staged in a live performance club, a concert hall, a theater, or the like, it can be said that people are inevitably gathering at that location. That is, it can be said that in the case of, for example, a stadium or a live performance club, there is a high inevitability of people gathering there.

On the other hand, unlike such facilities where people naturally gather, there are locations where the inevitability of people gathering there is not particularly great, such as a given street, streetcorner, or park. When people are gathering at such a location, it can be presumed that some accidental incident, or an unadvertised event such as a live guerrilla performance is happening at that location.

Accordingly, with respect to each of the positions P1, P2 ..., the inevitability of people's gathering is set in m levels as crowd inevitability levels and registered in advance. Thus, upon detecting that people are gathering at a given position, this crowd inevitability level is referred to and can be used in determining whether or not the gathering of people is inevitable or accidental.

The position-associated service data PSD is additional information associated with each position. For example, for the position Px corresponding to a business facility such as a store, pieces of information such as a store's advertisement, business information, image, homepage address, addles link, and discount information are registered as the position-associated service data PSD with respect to that position Px. Further, data such as a photographic image or comment as user-posted data with respect to that position may be also registered as the position-associated service data PSD.

In this way, on the position management database 78, information with respect to each of the positions P1, P2 . . . is registered in advance so that this information can be referred to when generating crowd information to be notified to the user of the terminal device 1.

4. Transmission of Current Condition Information from Terminal Device to Server Device A description will now be given of an example of the operation of an information provision system made up of the terminal device 1 (1A, 1B) and the server device 70 described above.

First, a description will be given here of an operation of communicating current condition information performed for managing a head count at each position in the server device 70.

As described above, the terminal device 1 or the terminal device 1A carried by the user transmits current condition information to the server device 70.

Figure 10:
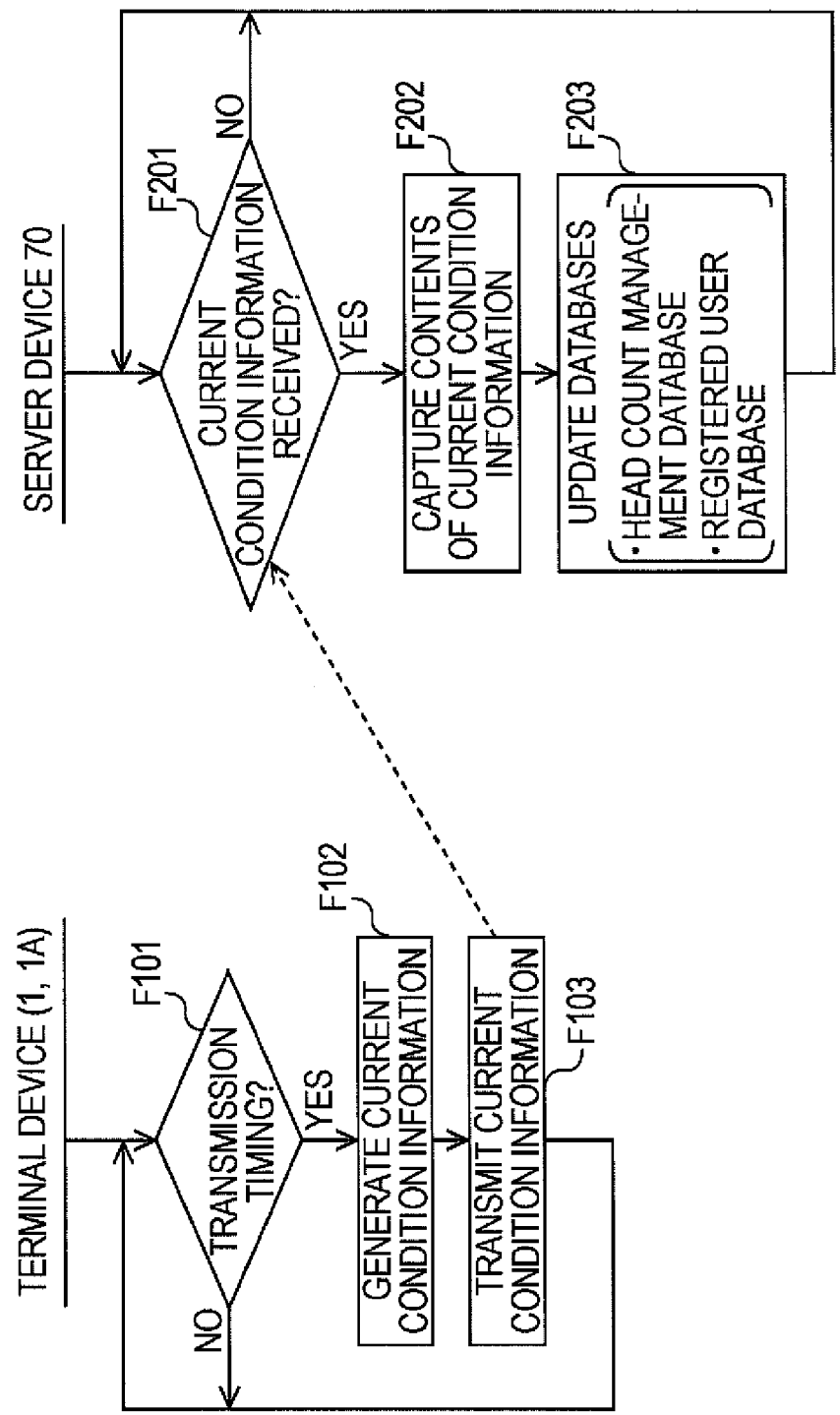
FIG. 10 is a flowchart of a process of transmitting/receiving current condition information according to an embodiment of the present invention.

For example, FIG. 10 shows processing in a case where the terminal device 1 (or 1A) transmits current condition information to the server device 70 automatically at periodic timing.

The system controller 10 of the terminal device 1 (or 1A) periodically executes the processing shown on the left side of FIG. 10. In response to this, the server control section 72 of the server device 70 performs the processing shown on the right side of FIG. 10.

First, in step F101, the system controller 10 of the terminal device 1 monitors the transmission timing. For example, every fixed time interval such as 30 seconds, 1 minute, or several minutes is set as the transmission timing, and the system controller 10 determines whether or not this transmission timing is reached, through time counting.

When the transmission timing is reached, the system controller 10 proceeds to step F102, where the system controller 10 generates current condition information.

It should be noted that in the terminal device 1, the system controller 10 constantly executes an operation of storing detected values of biometric information detected by the biometric sensor section 11, and motion information detected by the motion sensor section 12, into the detected information accumulating section 17b of the storage section 17. Also, the system controller 10 also stores position information (for example, a latitude/longitude) detected by the position detecting section 13 into the detected information accumulating section 17b.

Alternatively, the system controller 10 may store detected values respectively detected by the biometric sensor section 11, the motion sensor section 12, and the position detecting section 13 into the detected information accumulating section 17b, upon proceeding to step F102 after the transmission timing is reached.

In any case, upon proceeding to step F102 after the transmission timing is reached, the system controller 10 generates current condition information by using the latest detected information thus stored into the detected information accumulating section 17b.

FIGS. 11A to 11D each show an example of the contents of generated current condition information.

FIG. 11A shows an example in which current condition information includes a current condition information header, a user ID, date and time information, and position information.

FIG. 11B shows an example in which current condition information includes a current condition information header, a user ID, date and time information, position information, biometric information, and motion information.

FIG. 11C shows an example in which current condition information includes a current condition information header, a user ID, date and time information, position information, and biometric information.

FIG. 11D shows an example in which current condition information includes a current condition information header, a user ID, date and time information, position information, and motion information.

While there are other conceivable examples of the contents of current condition information, what kinds of information are included as the contents of current condition information depends on the system operation mode or the configuration of the terminal device 1.

The current condition information header contains basic matters about current condition information to be transmitted, such as an identification code for identifying information as being current condition information, synchronizing signal, data size, and information encoding format.

The user ID is user identification information uniquely assigned to each user. This may be identification information uniquely assigned to the terminal device 1.

The date and time information is information of the current year, month, day, hour, minute, and second. The system controller 10 adds the value of the current date and time counted by the date ad time counting section 15 to this current condition information.

The position information is position information (latitude/longitude) that has been detected by the position detecting section 13 and captured by the detected information accumulating section 17b.

While current condition information contains at least the pieces of information as shown in FIG. 11A, if the biometric sensor section 11 and the motion sensor section 12 are included as shown in FIGS. 2, 3, and 4, biometric information and motion information may be contained in the current condition information as shown in FIGS. 11B, 11C, and 11D.

Biometric information may be, for example, the very detected values of heart rate, pulse, brain waves, blood pressure, galvanic skin response, and the like, but may also contain psychological information for the user inferred from these detected values of biometric information.

For example, user's emotions (happy, amused, delighted, sad, scared, peaceful, feeling nostalgic, moved, startled, thrilled, nervous, and the like) can be inferred on the basis of fluctuations in the numeric values of biometric information due to a state of feeling nervous, excited, comfortable, or the like. This is because, for example, the detected values of heart rate, pulse, pulse, brain waves, blood pressure, and galvanic skin response, and the like fluctuate due to psychological changes. For example, whether or not the user is excited can be determined from the heart rate and respiratory information.

Further, the condition of the user (calm, in a hurry, or the like) can be determined also by the state of pupils and line-of-sight movements as detected by a visual sensor.

Further, movements of the user's body detected by the motion sensor section 12 may be used for the determination of the user's condition. For example, when the pulse or the like becomes faster, this may be due to nervousness or thrill, or this may be due to a user's motion such as running. For this determination, reference can be also made to information of an acceleration sensor or the like.

The system controller 10 can make the thus determined psychological information be included in the current condition information as a piece of biometric information.

It should be noted that inference of a psychological state takes a certain amount of time, and in some cases, it may be difficult to properly infer a psychological state by simply capturing information detected information from the biometric sensor section 11 temporarily. That is, detected information from the biometric sensor section 11 as a signal obtained from a living body changes in value from moment to moment. Thus, by simply looking at a value at a given instant, it is difficult to determine what psychological state the value indicates. Also, due to continuous changes in emotion, it may be better in some cases to change the threshold used for determination of a psychological state.

Accordingly, it is also appropriate to determine psychology by referring to changes in biometric information/motion information from a certain point in the past. That is, it is also appropriate to determine psychology by examining, in time series, the biometric information stored in the detected information accumulating section 17b, and referring to biometric information from a certain point in the past (for example, from several minutes ago).

After the system controller 10 generates the current condition information as illustrated in FIGS. 11A to 11B in step F102, in step F103, the system controller 10 causes the current condition information to be transmitted from the communicating section 18 to the server device 70.

On the terminal device 1 side, the processing of steps S102 and F103 mentioned above is performed at every periodic transmission timing.

It should be noted that the processing of steps S102 and F103 may not necessarily be performed periodically but may be performed in response to some trigger, such as a user's operation, the ambient environment, or a change in current position.

On the server device 70 side, the server control section 72 performs the processing of steps F201, F202, and F203.

That is, once current condition information from a given terminal device 1 is received by the communicating section 73, the server control section 72 proceeds from step F201 to step F202, and captures the contents of the received and decoded current condition information onto the network storage section 71.

Then, in step F203, the server control section 72 transfers necessary information contained in the captured current condition information, to the database management section 74, and instructs database updating.

The database management section 74 performs an updating process with respect to the head count management database 75 and the registered user database 76 in the manner as described below.

First, as for the head count management database 75, an updating process is performed by referring to the position information and user IDs in the received current condition information.

Figure 12:
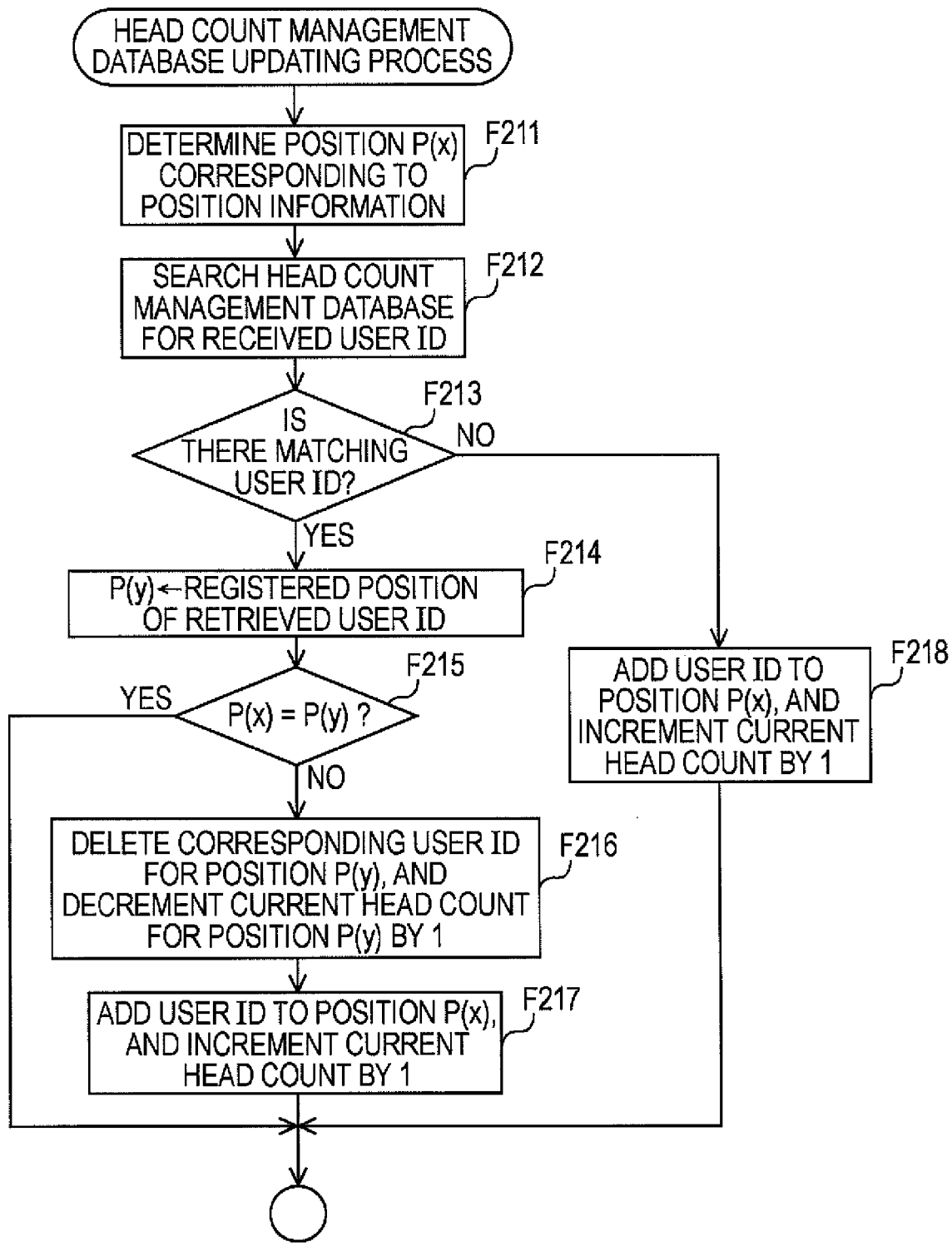
FIG. 12 is an explanatory diagram of a process of updating a head count management database according to an embodiment of the present invention.

An example of the updating process for the head count management database 75 is shown in FIG. 12.

In step F211, the database management section 74 determines to which of the positions P1, P2 . . . managed on the head count management database 75 the position information contained in received current condition information, for example, latitude/longitude information corresponds. The thus determined position is taken as P(x).

Of course, the above-mentioned processing may be performed as it is if the positions P1, P2 . . . on the head count management database 75 are directly expressed as the values of latitude/longitude. However, if, for example, the fineness of a detected position as latitude/longitude and the range of each of the positions P1, P2 . . . do not match, a position P on the management database corresponding to the longitude/latitude is determined.

Next, in step F212, the database management section 74 searches the head count management database 75 to determine whether or not a user ID that matches a user ID included in the received current condition information is registered on the head count management database 75. As shown in FIGS. 7A and 7B, on the head count management database 75, people currently present are registered by their user IDs with respect to each of the positions P1, P2 . . . , so the database management section 74 determines whether or not the received user ID exists among these registered user IDs.

If no matching user ID is found, the database management section 74 proceeds from step F213 to step F218, and adds the received user ID as a user ID with respect to the position P(x), and increments the value of the current head count for the position P(x) by 1.

If a matching user ID is found, the database management section 74 proceeds from step F213 to step F214, and sets, from among the positions P1, P2 . . . , a position with respect to which the retrieved user ID is registered, as a position P(y).

Then, in step F215, the database management section 74 determines whether or not the position P(x)=the position P(y). If the position P(x)=the position P(y), this means that there is no change from the currently registered contents. That is, the user of the terminal device 1 that transmitted the current condition information received this time is present at the same position as that when the user transmitted current condition information last time.

Since no updating is necessary in this case, the processing is terminated as it is.

On the other hand, if it is determined in step F215 that the position P(x)=the position P(y) does not hold, this means that the user has moved to a position different from that at the time of the last transmission of current condition information, so the database management section 74 proceeds to step F216 and performs updating.

First, in step F216, the database management section 74 deletes the corresponding user ID registered with respect to the position P(y). Also, the database management section 74 decrements the value of the current head count with respect to the position P(y) by 1.

In step F217, the database management section 74 adds the received user ID as a user ID with respect to the position P(x), and increments the value of the current head count for the position P(x) by 1.

The database management section 74 performs the above-mentioned processing every time current condition information is received, thereby making it possible for the head count management database 75 to grasp the head count with respect to each of the positions P1, P2 . . . , and users who are present there.

Figure 13:
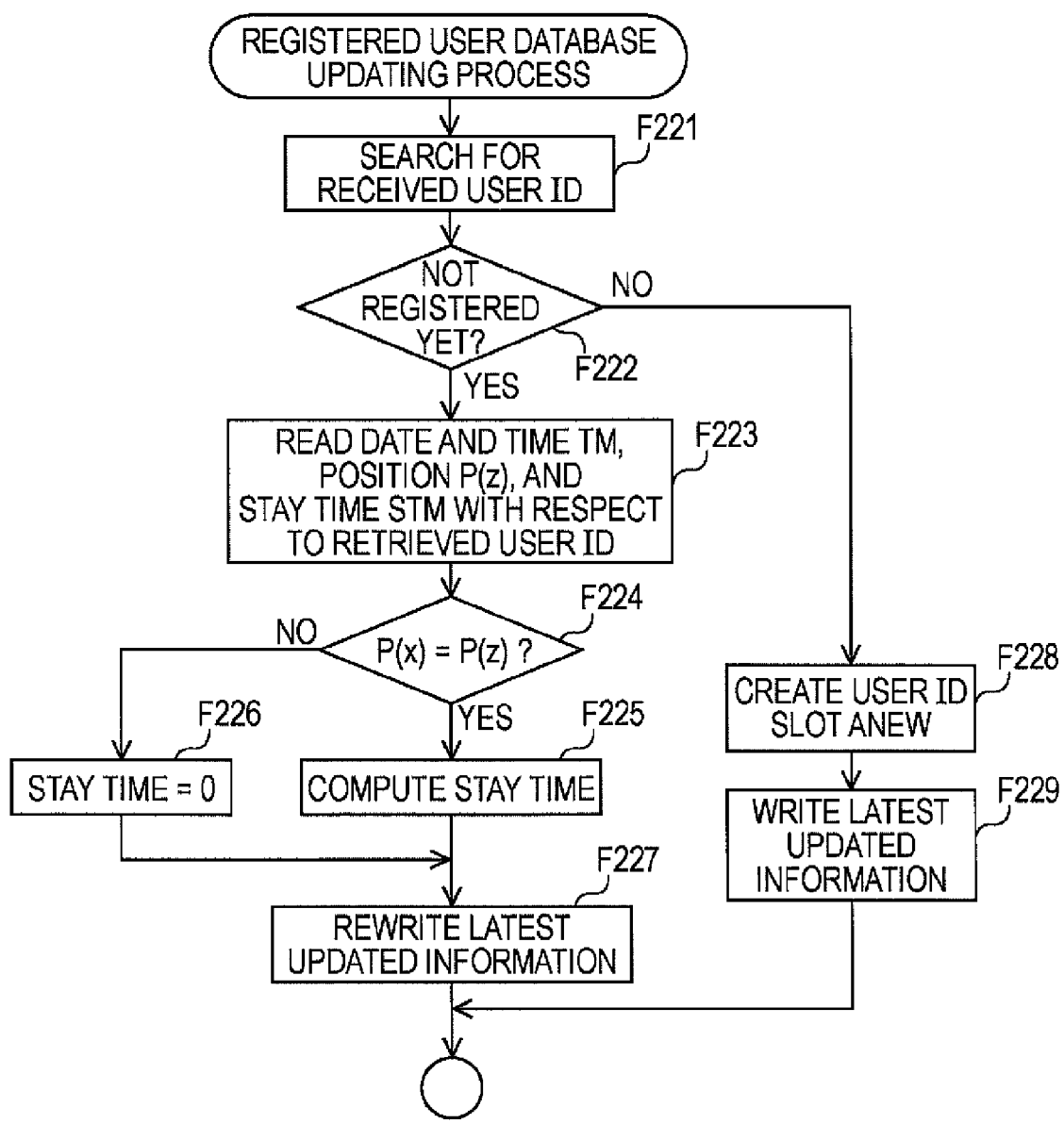
FIG. 13 is an explanatory diagram of a process of updating a registered user database according to an embodiment of the present invention.

The database management section 74 also performs an updating process for the registered user database 76 on the basis of an instruction from the server control section 72. This updating process is shown in FIG. 13.

First, in step F221, the database management section 74 searches the registered user database 76 for a received user ID, and determines whether or not the received user ID has already been registered.

If a user ID included in received current condition information is a user ID that has already been registered on the registered user database 76, the database management section 74 proceeds from step F222 to step F223 where, first, the database management section 74 reads the date and time TM, position P(z), and stay time STM in the latest updated information registered with respect to that user ID.

Then, the database management section 74 determines whether or not the read position P(z) matches the position P(x) determined in step F211 of FIG. 12 mentioned above.

That is, as in step F215 of FIG. 12 mentioned above, this determination is made for determining whether or not the user is present at the same position as that at the time of the last transmission of current condition information.

In the above-mentioned example, it is determined in the processing of steps F221 to F224 whether or not a user ID has been registered, and whether or not the user's position has moved. However, if the processing of FIG. 12 has already been executed, these determinations have already been made in the database management section 74, so these determination processes can be omitted.

If it is determined that the user is present at the same position as that at the time of the last transmission of current condition information, the database management section 74 proceeds to step F225, and computes the stay time. This may be performed by adding the time difference between the date and time indicated by the current condition information received this time, and the registered date and time TM, to the registered value of stay time STM. That is, the stay time STM is set as follows.

Stay time STM=stay time STM+(date and time
    included in current condition information−date
    and time TM)

On the other hand, if it is determined that the user has moved to a position different from that at the time of the last transmission of current condition information, the database management section 74 proceeds to step F226, and sets the stay time STM=0.

Upon setting the stay time STM in this way, the database management section 74 performs an updating process in step F227.

That is, in the latest update information as the slot for the corresponding user ID on the registered user database 76, the value of the date and time TM is rewritten to the value of the date and time indicated by the received current condition information.

Also, the value of the position is set to the position P(x).

Also, the value of the stay time STM is rewritten to the value obtained by step F225 or F226 mentioned above.

Also, if biometric information and motion information are included in the received current condition information, the biometric information BD and the motion information PD on the registered user database 76 are rewritten to the received contents.

In step F222, if a user ID included in the received current condition information is a user ID that has not been registered on the registered user database 76, the database management section 74 proceeds from step F222 to step F228, and provides a new slot for performing registration with respect to the user ID received this time. Then, in step F229, the database management section 74 writes the date and time TM, position, biometric information BD, motion information PD, and stay time STM as the latest updated information into the slot. As for the date and time TM, biometric information BD, and motion information PD, values included in the contents of the received current condition information are written. The position is set as the position P(x) mentioned above. The stay time STM may be set to "0".

Through the above-mentioned processing, for example, the database management section 74 performs updating of the registered user database 76 in accordance with reception of current condition information.

Database updating is performed in the processing of FIGS. 12 and 13 due to the instruction from the server control section 72 in step F203 of FIG. 10 mentioned above. On the server device 70 side, current condition information is successively sent from a large number of terminal devices 1. Every time such current condition information is received, the above-mentioned database updating is performed, thereby making it possible to manage the conditions of a larger number of users on the server device 70 side.

In particular, on the head count management database 75, the current head count for each of the positions P1, P2..., and information on people present at that position can be managed.

Further, with the latest updated information on the registered user database 76, the current position, stay time, biometric information, and motion information can be grasped for each user.

5. Determination of Head Count Transition in Server Device

As an example of the head count management database 75, an example of registering head count progress information (for example, the head count as of x minutes ago, the head count as of 2x minutes ago...) has been described above with reference to FIG. 7B.

Figure 14:
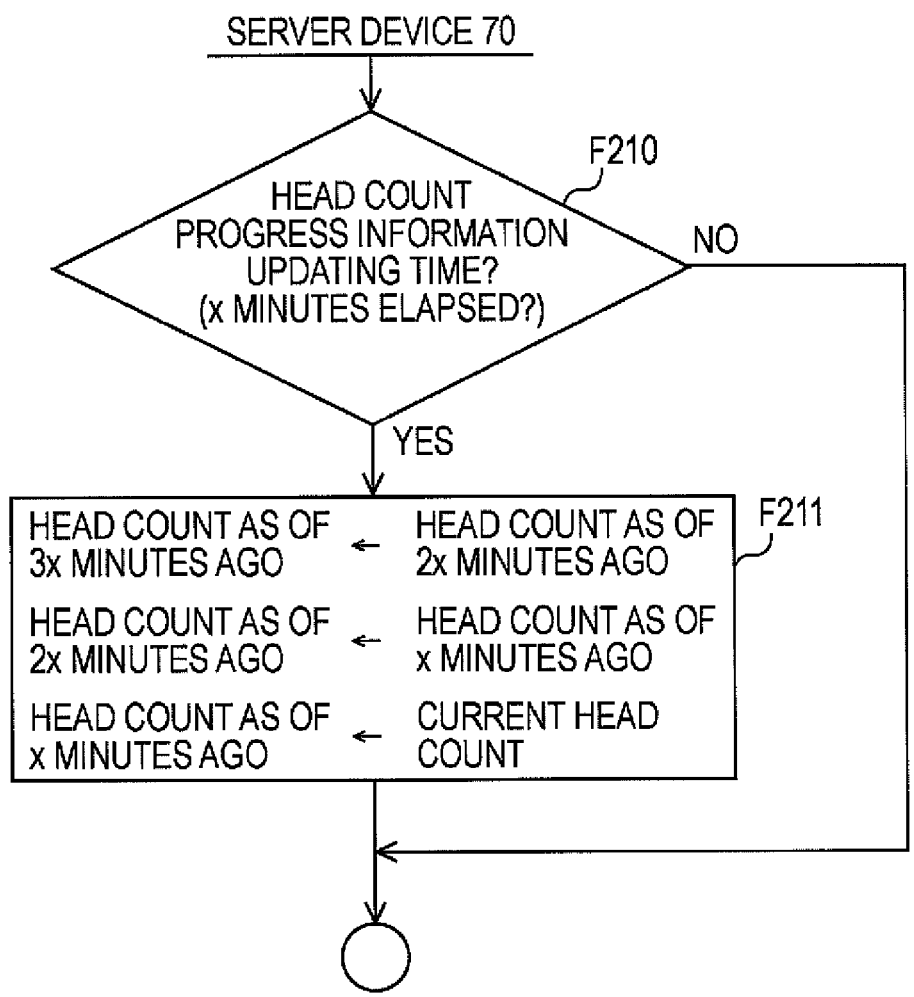
FIG. 14 is a flowchart of a process of managing changes in head count according to an embodiment of the present invention.

In the case of such a database structure, it is necessary to update the head count progress information through the process as shown in FIG. 14 at each unit time interval.

For example, upon counting the elapse of a unit time (x minutes) in step F210 of FIG. 14, in step F211, the server control section 72 instructs the database management section 74 to execute updating of the head count progress information.

As an example of the updating process performed by the database management section 74, the value of the head count as of 3x minutes ago may be updated to the value of the head count as of 2x minutes ago, the value of the head count as of 2x minutes ago may be updated to the value of the head count as of 1x minutes ago, and the value of the head count as of 1x minutes ago may be updated to the value of the current head count.

In this way, the condition of the head count for each unit time of x minutes can be managed on the head count management database 75, and changes in head count with respect to each of the positions P1, P2... can be grasped on the server device 70 side.

6. Operation Example I for Display of Crowd Information

Since the current head count with respect to each of the positions P1, P2... is managed on the server device 70 side as mentioned above, it is possible to provide information about a "position where people are gathering" to the terminal device 1 or the terminal device 1B.

Now, a description will be given of an operation in which the server device 70 provides crowd information containing information about a "position where people are gathering", to the terminal device 1 (or 1B).

Figure 15:
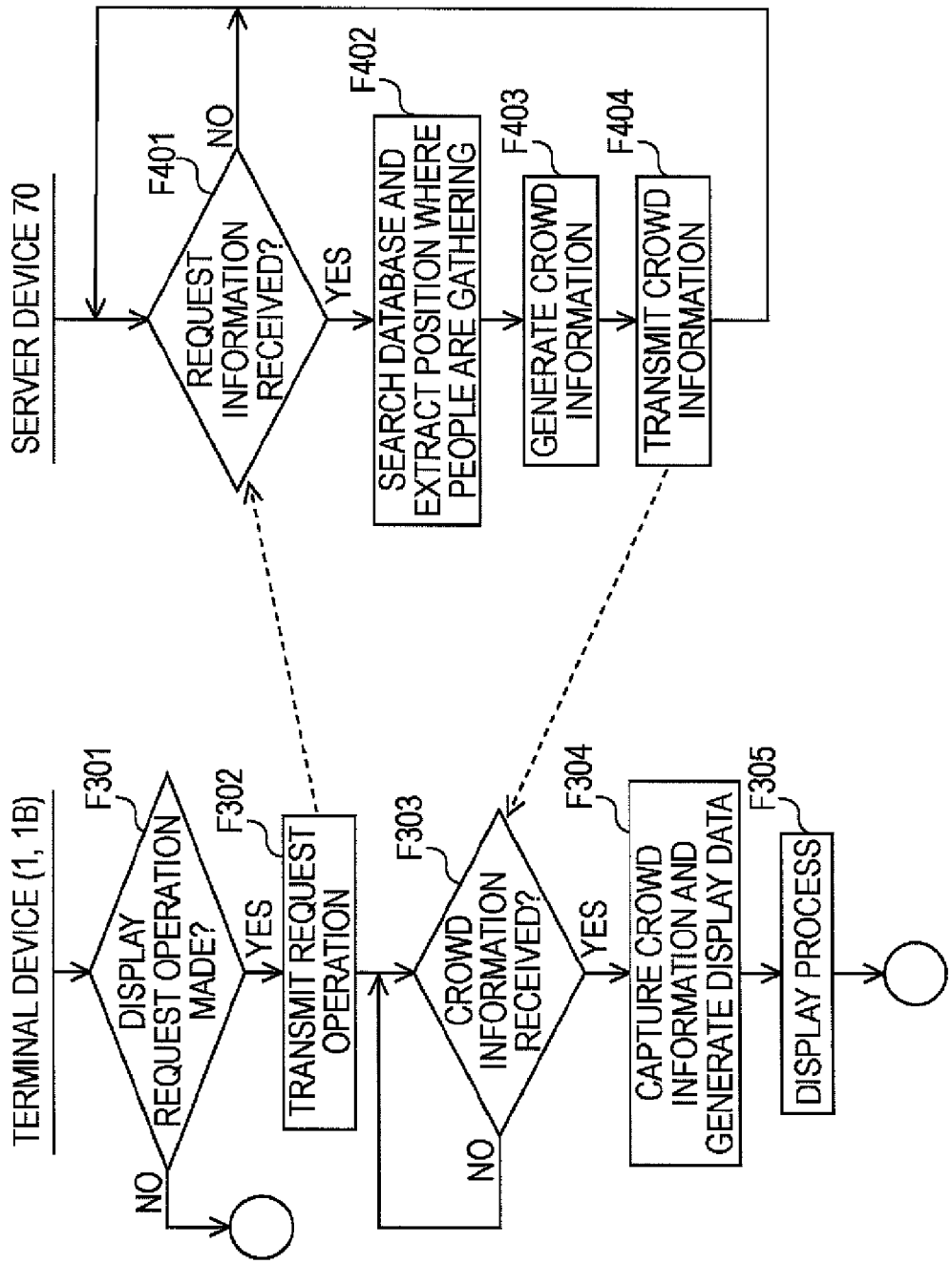
FIG. 15 is a flowchart of an operation example I for display of crowd information according to an embodiment of the present invention.

FIG. 15 shows processing of the system controller 10 of the terminal device 1, and processing of the server control section 72 of the server device 70, at the time of communication of crowd information.

FIG. 15 shows a processing example in which the server device 70 transmits crowd information in response to a request from the terminal device 1.

When wishing to see the display of a location where people are gathering on a map image, the user makes a predetermined display request operation through the operating section 16, for example.

Upon detecting the display request operation, the system controller 10 proceeds from step F301 to step F302 and generates request information, and causes the request information to be transmitted from the communicating section 18 to the server device 70.

Figure 16A:
FIGS. 16A to 16D are explanatory diagrams of the structure of request information according to an embodiment of the present invention.
Figure 16B:
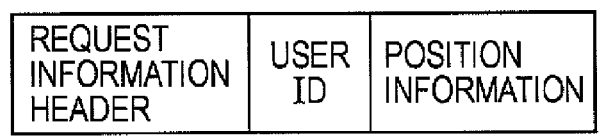

Examples of the configuration of request information are shown in FIGS. 16A to 16D. In this case, the system controller 10 generates request information of a structure as shown in FIG. 16A or 16B for transmission.

FIG. 16A shows an example of request information made up of a request information header, and a user ID.

FIG. 16B shows an example of request information made up of a request information header, a user ID, and position information.

It should be noted that FIGS. 16C and 16D each show an example of request information including extraction criterion information, and this example will be described later.

The request information header includes basic matters about current condition information to be transmitted, such as an identification code for identifying information as being request information, synchronizing signal, data size, and information encoding format.

Request information is generated by adding a user ID, or a user ID and position information to the request information header. In a case here position information is added, position information detected by the position detecting section 13 as of the time of generation of this request information, or the latest position information that has been captured by the detected information accumulating section 17b as of this time may be used.

On the server device 70 side, the processing of steps F401 to F404 is performed in response to request information from the terminal device 1.

When the communicating section 73 receives request information from a given terminal device 1, the server control section 72 proceeds from step F401 to step F402, and instructs the database management section 74 to perform a search.

In this case, the database management section 74 is instructed to search for a "location where people are gathering".

The database management section 74 extracts a location where people are currently gathering from the head count management database 75.

As for the method of extraction processing at this time, various methods such as (s1) to (s6) below are conceivable.

(s1) On the head count management database 75, a position P(x) where the current head count is larger than a predetermined reference head count M is extracted.

This is a method of extracting a location where the current head count is equal to or larger than the reference head count M (for example, M=20 people), simply on the basis of the value of the current head count on the head count management database 75.

(s2) On the head count management database 75, a position P(x) where the current head count is larger than a predetermined reference head count M is extracted, but the reference head count M is varied in accordance with the average crowd level at each position.

As already described above, if the determination as to whether or not people are gathering is made by simply comparing a fixed reference head count M and the current head count against each other, a district where many people are usually present is constantly determined as a location where people are gathering, whereas in a location where hardly anyone is usually present usually, even when several people are gathering unusually, it is determined that people are not gathering at that location. This is not very appropriate in the case of categorizing a location where people are gathering as a location where an accidental incident is happening, an interesting location, or the like.

Accordingly, for each of the positions P1, P2 . . . , the reference head count M is varied in accordance with the average crowd level registered on the position management database 78.

For example, the determination criterion is varied for each location in such a way that the reference head count M=5 people for locations where not many people are present, the reference head count M=20 people for downtown areas of provincial cities, and the reference head count M=50 people for downtown areas of big cities.

In this way, a "location where many people are gathering" can be accurately extracted.

(s3) On the head count management database 75, a position P(x) where the degree of increase in head count (amount of change in head count) is equal to or larger than a predetermined reference amount of change is extracted. For example, if, for example, the head count management database 75 is configured as shown in FIG. 7B, changes in head count can be determined for each position. Accordingly, an arrangement is conceivable in which, for example, the head count as of a predetermined period of time ago and the current head count are compared against each other, and a location where the number of increase or the rate of increase in count exceeds a reference number of increase or a reference rate of increase. That is, a "location where people are beginning to gather" can be extracted.

(s4) As in (s3) mentioned above, the head count as of a predetermined period of time ago and the current head count are compared against each other to extract a location where the number of increase or the rate of increase in count exceeds a reference number of increase or a reference rate of increase, but the reference number of increase or the reference rate of increase is varied in accordance with the average crowd level registered on the position management database 78. That is, a "location where people are beginning to gather" is determined and extracted in accordance with the normal number of people present at each position.

(s5) A location where the current head count is larger than a predetermined reference head count M, and the number of increase or rate of increase in head count exceeds a reference number of count or a reference rate of increase is extracted. That is, a location where the absolute level of the current head count is large and people are currently beginning to gather is extracted.

(s6) The extraction method is the same as that of (s5) mentioned above, except for varying one or both of the reference head count M and the reference number of increase (or the reference rate of increase) in accordance with the average crowd level registered on the position management database 78. That is, while a location where the absolute level of the current head count is large and people are currently beginning to gather is extracted, further, the number of people normally present at each position is also taken into account.

As described above, while various methods are conceivable as the method of extraction processing for a "location where people are gathering", in step F402, a position P(s) as a "location where people are gathering" is extracted from among the positions P1, P2 . . . registered on the head count management database 75 by one of these extraction methods.

Subsequently, in step F403, the server control section 72 receives from the database management section 74 extraction result information as a location where people are gathering, and generates crowd information.

Examples of the contents of crowd information are shown in FIGS. 17A to 17F.

As shown in FIG. 17A, crowd information includes, for example, a crowd information header, and one or a plurality of data units as crowd position information added subsequent to the crowd information header.

The crowd information header includes basic matters about current condition information to be transmitted, such as an identification code for identifying information as being crowd information, synchronizing signal, data size, information encoding format, and the number of data units of crowd position information to be added.

A single piece of crowd position information is a data unit corresponding to a single extracted position.

FIG. 17B shows an example in which a single piece of crowd position information is made up of only position information.

FIG. 17C shows an example in which a single piece of crowd position information is made up of position information and current head count.

FIG. 17D shows an example in which a single piece of crowd position information is made up of position information, current head count, and crowd inevitability level.

FIG. 17E shows an example in which a single piece of crowd position information is made up of position information, current head count, and extraction criterion.

FIG. 17F shows an example in which a single piece of crowd position information is made up of position information, current head count, extraction criterion, position attribute, and position-associated service data.

Of course, other than those mentioned above, various other combinations of the contents are conceivable.

In the case of crowd position information described above, the position information represents information that indicates the position P(s), which is a location where people are gathering and is extracted from the head count management database 75, by its latitude/longitude, for example.

The current head count represents the registered value of current head count for the extracted position P(s). The value of the number of increase in head count or rate of increase in head count may be included as well.

The crowd inevitability level, position attribute, and position-associated service data each represent the information registered on the position management database 78 described above with reference to FIG. 9.

The extraction criterion represents data of some criterion used in a case where filtering (narrowing) is performed by that criterion when extracting the position P(s) as a location where people are gathering. The extraction criterion will be described later.

Such crowd position information is generated with respect to a single extracted position P(s). Accordingly, if n positions P(s) are extracted as locations where people are gathering, this results in a data format as shown in FIG. 17A in which n pieces of crowd position information are generated and placed subsequent to the crowd information header.

If not even a single position P(s) is extracted as a location where people are gathering, information indicating that the number of units of crowd position information=0 may be placed in the crowd information header, and no crowd position information may be added, or a data unit as dummy crowd position information may be added.

Upon generating the above-mentioned crowd information in step F403, in step F404, the server control section 74 causes the crowd information to be transmitted from the communicating section 73 to the terminal device 1 that has transmitted request information.

After causing request information to be transmitted in step F302, in step F303, the system controller 10 of the terminal device 1 waits for the reception of crowd information from the server device 70.

Upon receiving crowd information, the system controller 10 proceeds to step F304, and causes the contents of the crowd information to be stored into the communication data storing section 17a of the storage section 17. Then, by using the contents of the crowd information, that is, the contents of each piece of crowd position information included in the crowd information, the system controller 10 generates display data for notification display of a location where people are gathering.

Thereafter, in step F305, the system controller 10 causes a map image to be displayed on the display section 14 by using map drawing data stored in the map database 71c, and performs control so that display data as a notification display of a location where people are gathering is displayed so as to be superimposed on the map image.

Through the above-mentioned operations, the user of the terminal device 1 can see a display showing a location where people are gathering, on a map image displayed on the display section 14.

7. Operation Example II for Display of Crowd Information

Next, an operation example II for display of crowd information will be described with reference to FIG. 18. In this example, the user can specify not only a criterion for a location where people are gathering, but also what kind of people are gathering.

When wishing to see the display of a location where people are gathering on a map image, the user of the terminal device 1 makes a predetermined request operation through the operating section 16, for example.

In response to the display request operation, the system controller 10 proceeds from step F311 to F312, where the system controller 10 generates extraction criterion information.

For example, on the display section 14, a display asking the user to select an extraction criterion is made, thus urging the user to make an input. For example, the user may be allowed to arbitrarily select an age criterion such as "child", "adult", "20s", "30 to 35", or "50 and over", sex such as "male" or "female", or a hobby/preference criterion such as "person who likes music" or "person who likes shopping".

Then, in accordance with the user's selection input, information as an extraction criterion is generated.

Upon generating the extraction criterion information, the system controller 10 generates request information in step F313.

Figure 16C:
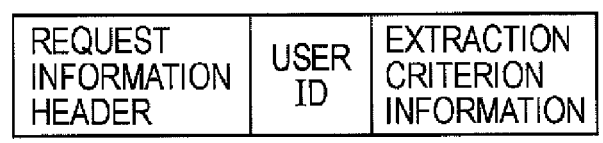

In this case, the request information is generated as information including the extraction criterion information in addition to the request information header and user ID, as shown in FIG. 16C. Alternatively, the request information is generated as information including the extraction criterion information in addition to the request information header, user ID, and position information, as shown in FIG. 16D.

Upon generating the request information, in step F314, the system controller 10 causes the request information to be transmitted from the communicating section 18 to the server device 70.

On the server device 70 side, the processing of steps F411 to F414 is performed in response to the request information from the terminal device 1.

When the communicating section 73 receives request information from a given terminal device 1, the server control section 72 proceeds from step F411 to step F412, and instructs the database management section 74 to perform a search.

In this case, the communicating section 73 instructs the database management section 74 to search for a "location where people are gathering", and also perform filtering based on extraction criterion information included in the request information.

The database management section 74 extracts a location where people matching the extraction criterion information are currently gathering, by using the head count management database 75 or the registered user database 76.

While various methods of extraction processing are conceivable, the following processes (A) and (B) can be given as examples.

(A) First, from the head count management database 75, one or a plurality of positions P(s) each being a "location where people are gathering" are extracted by either of the above-described methods (s1) to (s6). Thereafter, with respect to each of user IDs registered for each of the extracted positions P(s), registered attribute information (information about age, sex, and hobby/preference) on the registered user database 76 is referred to, and users who do not match the extraction criterion are removed. By subtracting the number of the removed users from the current head count on the head count management database 75, it is possible to know how many people who match the extraction criterion are present at the position P(s). By comparing this number of people against a predetermined reference head count, it is possible to determine whether or not each position is a "location where many people matching a specific extraction criterion are gathering".

(B) User IDs that match extraction criterion information are extracted from the registered user database 76 by referring to registered attribute information. Then, by referring to the latest updated information with respect to the user IDs that match the criterion, the current positions are summed up. The head count for each position obtained as this summed result is compared against a predetermined reference head count, thereby making it possible to determine whether or not each position is a "location where many people matching a specific extraction criterion are gathering".

In this way, for example, a position as a location where many people who match extraction criterion information are gathering can be extracted.

Subsequently, in step F413, the server control section 72 receives extraction result information as a location where many people who match the extraction criterion information are gathering, from the database management section 74, and generates crowd information.

The contents of the crowd information are as described above with reference to FIGS. 17A to 17F. In this case, in particular, it is also suitable to add extraction criterion information to the crowd position information as shown in FIGS. 17E and 17F.

Upon generating the above-mentioned crowd information in step F413, in step F414, the server control section 74 causes the crowd information to be transmitted from the communicating section 73 to the terminal device 1 that has transmitted request information.

After causing request information to be transmitted in step F314, in step F315, the system controller 10 of the terminal device 1 waits for the reception of crowd information from the server device 70.

Upon receiving crowd information, the system controller 10 proceeds to step F316, and causes the contents of the crowd information to be stored into the communication data storing section 17a of the storage section 17. Then, by using the contents of the crowd information, that is, the contents of each piece of crowd position information included in the crowd information, the system controller 10 generates display data for notification display of a location where people are gathering.

Thereafter, in step F317, the system controller 10 causes a map image to be displayed on the display section 14 by using map drawing data stored in the map database 71c, and performs control so that display data as a notification display of a location where people are gathering is displayed so as to be superimposed on the map image. Examples of the display will be described later.

Through the above-mentioned operations, the user of the terminal device 1 is able to know a location where people who match a specific extraction criterion are gathering on a map image, through display made on the display section 14.

Since there are various conceivable examples of filtering performed on the server device 70 side in accordance with extraction criterion information, these examples will be collectively described later.

8. Operation Example III for Display of Crowd Information

While the above-mentioned operation examples I and II are directed to a case in which the server device 70 transmits crowd information to the terminal device 1 in response to request information from the terminal device 1 side, a case is also conceivable in which the server device 70 successively transmits crowd information to the terminal device 1. This will be described below as an operation example III.

Figure 19:
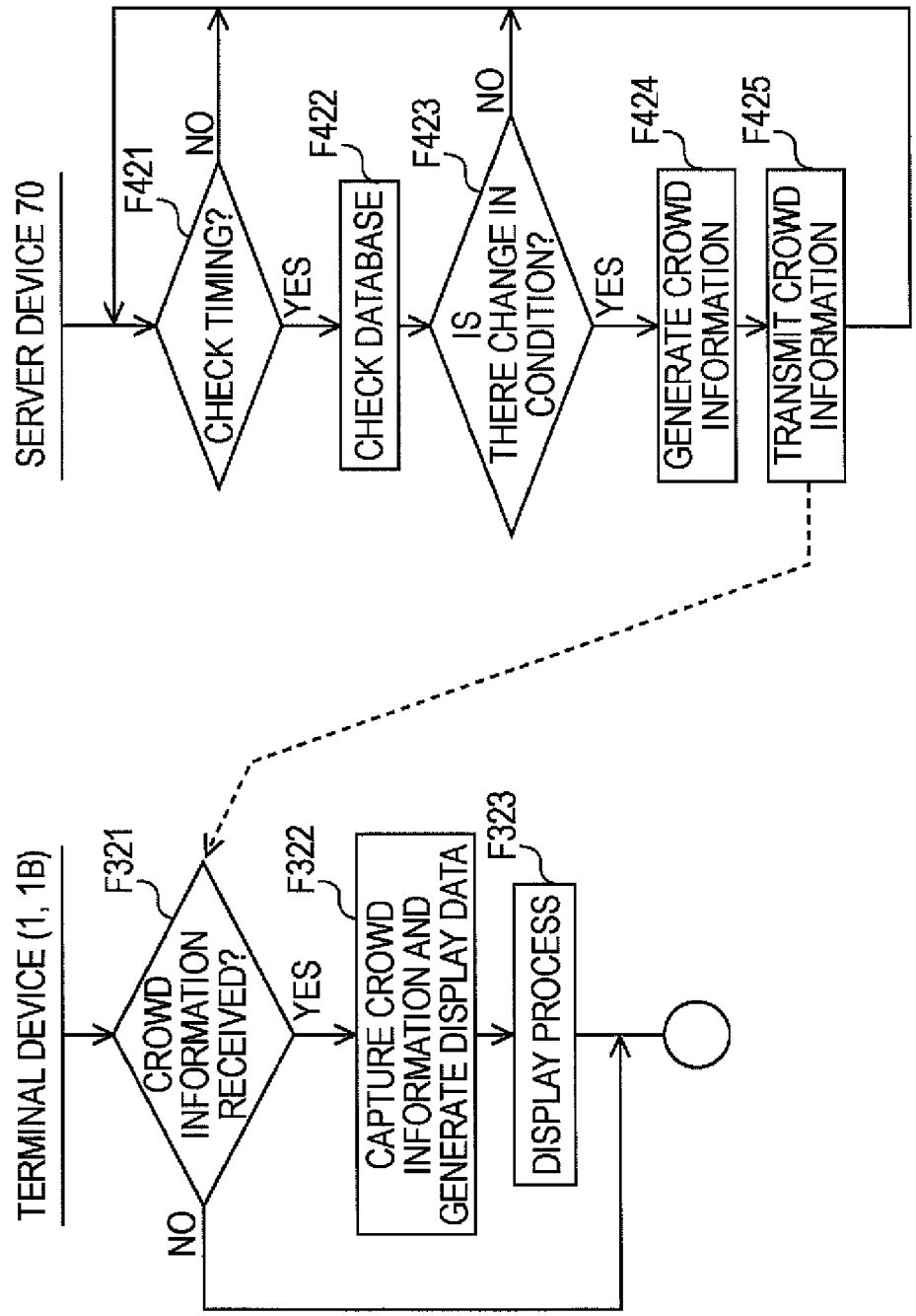
FIG. 19 is a flowchart of an operation example III for display of crowd information according to an embodiment of the present invention.

FIG. 19 shows, as the operation example III, processing of the system controller 10 of the terminal device 1, and processing of the server control section 72 of the server device 70.

In step F421, the server control section 72 monitors periodic check timing, for example.

When the check timing is reached, the server control section 72 proceeds to step F422, and instructs the database management section 74 to perform a database check.

The database management section 74 examines the head count management database 75 in response to the instruction, and determines whether or not a position where the degree of gathering of people has changed exists.

Whenever instructed to perform a database check, the database management section 74 may extract a "location where people are gathering" by a processing method as described above in either of (s1) to (s6), and determine whether or not there has been a change in condition, in accordance with the extraction result.

For example, the database management section 74 stores a position (s) extracted as a "location where people are gathering" through the extraction processing at the last check timing. Then, at the current check timing, a position where a number of people equal to a reference head count or more are gathering is extracted, and it is determined whether or not one or plurality of such positions P(s) as the extraction result match the one or plurality of positions P(s) obtained as the last extraction result.

If there is any position that no longer qualifies as a "location where people are gathering", or any position that was not extracted last time but is extracted as a "location where people are gathering" this time, then it is determined that there has been a change in condition.

If a result indicating that there has been no change in condition is received from the database management section 74, the server control section 72 returns the processing from step F423 to step F421, and waits for the next check timing.

On the other hand, if a result indicating that there has been a change in condition is received from the database management section 74, the server control section 72 proceeds from step F423 to step F424, and generates crowd information. That is, the database management section 74 receives position information obtained as the extraction result performed by the database management section 74 this time, and generates the crowd position information as shown in FIGS. 17B to 17F in association with each extracted position, thus generating the crowd information shown in FIG. 17A containing data units as such crowd position information.

Then, in step F425, the server control section 72 causes the crowd information to be transmitted from the communicating section 73 to the terminal device 1. In this case, the crowd information may be transmitted not to a specific terminal device 1 but to a large number of terminal devices 1.

In step F321, the system controller 10 of the terminal device 1 waits for the reception of crowd information from the server device 70.

Then, upon receiving crowd information, the system controller 10 proceeds to step F322, and causes the contents of the crowd information to be stored into the communication data storing section 17a of the storage section 17. Then, by using the contents of the crowd information, that is, the contents of each piece of crowd position information included in the crowd information, the system controller 10 generates display data for notification display of a location where people are gathering.

Thereafter, in step F323, the system controller 10 causes a map image to be displayed on the display section 14 by using map drawing data stored in the map database 71*c*, and performs control so that display data as a notification display of a location where people are gathering is displayed so as to be superimposed on the map image. Examples of the display will be described later.

Through the above-mentioned operations, the user of the terminal device 1 is able to know a location where people are currently gathering on a map image displayed on the display section 14, without performing any particular operation, as crowd information is transmitted from the server device 70 side.

9. Example by Filtering Process by Extraction Criterion

In the example described as the operation example II mentioned above, the user of the terminal device 1 specifies an extraction criterion such as age, sex, hobby/preference, or the like, and filtering by the extraction criterion is performed on the server device 70 side to extract a location where people who match the extraction criterion are gathering.

On the other hand, as in the processing on the terminal device 1 side described as the processing on the left side of FIG. 15, it is also possible to perform filtering on the server device 70 without the user of the terminal device 1 particularly specifying an extraction criterion. For example, an operation example is conceivable in which the processing of the terminal device 1 on the left side of FIG. 15 is combined with the processing on the server device 70 side on the right side of FIG. 18. Further, it is also conceivable to perform filtering in the processing on the server device 70 side in FIG. 19.

Now, various specific examples of filtering process that can be applied to these system operations will be described.

An example is conceivable in which the extraction on the server device 70 side of a position P(s) as a location where people are gathering is performed by filtering based on an area range.

For example, the user of the terminal device 1 specifies a specific area range as extraction criterion information. For example, an area range is specified by a place name, a district name, or specification of a range on a map image. The terminal device 1 adds the thus specified area range as extraction criterion information, and transmits request information as shown in FIGS. 16C and 16D. On the server device 70 side, a search is made for a location where people are gathering, with respect to positions within a range corresponding to the extraction criterion, and crowd information is generated.

Further, it is also possible to set a specific area range as a target search range with reference to the current position of the terminal device 1, without the user of the terminal device 1 specifying an extraction criterion.

Figure 16D:
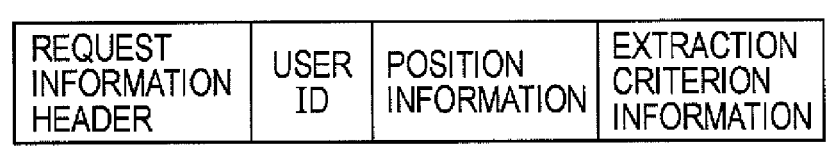

Since the terminal device 1 places position information in request information as shown in FIGS. 16B and 16D, on the server device 70 side, the position where the user of the terminal device 1 is currently present can be located. Accordingly, on the server device 70 side, an area range is set as, for example, being within a radius of x km, or within the same city, the same prefecture, or the like, with reference to a position indicated by the position information (user's current position) included in the request information, which is taken as the center of the range. Then, a location where people are gathering is searched for with respect to positions within the area range, thus generating crowd information.

Even if position information is not included in the request information, the terminal device 1 (excluding the terminal device 1B in this case) has already transmitted current condition information and successively notified the server device 70 of the current position through the processing of FIG. 10. Therefore, on the server device 70 side, the current user position can be confirmed by searching the registered user database 76 with a user ID. In that case, with reference to the confirmed user position, an area range is set as being within a radius of x km, or within the same city or same prefecture or the like, and a location where people are gathering is searched for with respect to positions within the area range, thus generating crowd information.

One of the aims of this embodiment is to inform the user of the terminal device of a location where people are gathering as a location where an interesting incident is happening. However, this does not mean much if the position thus informed is too far for the user to reach. With this taken into consideration, filtering based on an area range set with reference to the current user position is appropriate in the sense that useful information can be provided to the ser.

On the other hand, in a case where the user specifies an area range as an extraction criterion, the user can also know how many people are gathering in a far, remote area, irrespective of the position where the user himself/herself is present. This proves advantageous in cases where, for example, the user wants to know how many people are gathering in a given area, not for the purpose of going to that place but for the purpose of a research or a study, for example, since the user can take a look at how many people are gathering at an arbitrary place, irrespective of the position of the user himself/herself.

It should be noted that when filtering based on an area range is performed, the process of extracting a position as a location where people are gathering can be also made more efficient.

Next, filtering based on a person's attribute is also conceivable.

As described above, the user of the terminal device 1 selects age, sex, or hobby/preference as extraction criterion information, and the terminal device 1 transmits request information as shown in FIGS. 16C and 16D to which the specified extraction criterion information has been added. On the server device 70 side, a location where people matching the extraction criterion information are gathering is retrieved, and crowd information is generated.

Thus, the user of the terminal device 1 is able to know information on a location where people are gathering on the basis of an arbitrary criterion, such as a location where women are gathering, a location where children are gathering, or a location where people whose hobby is music are gathering.

Figure 18:
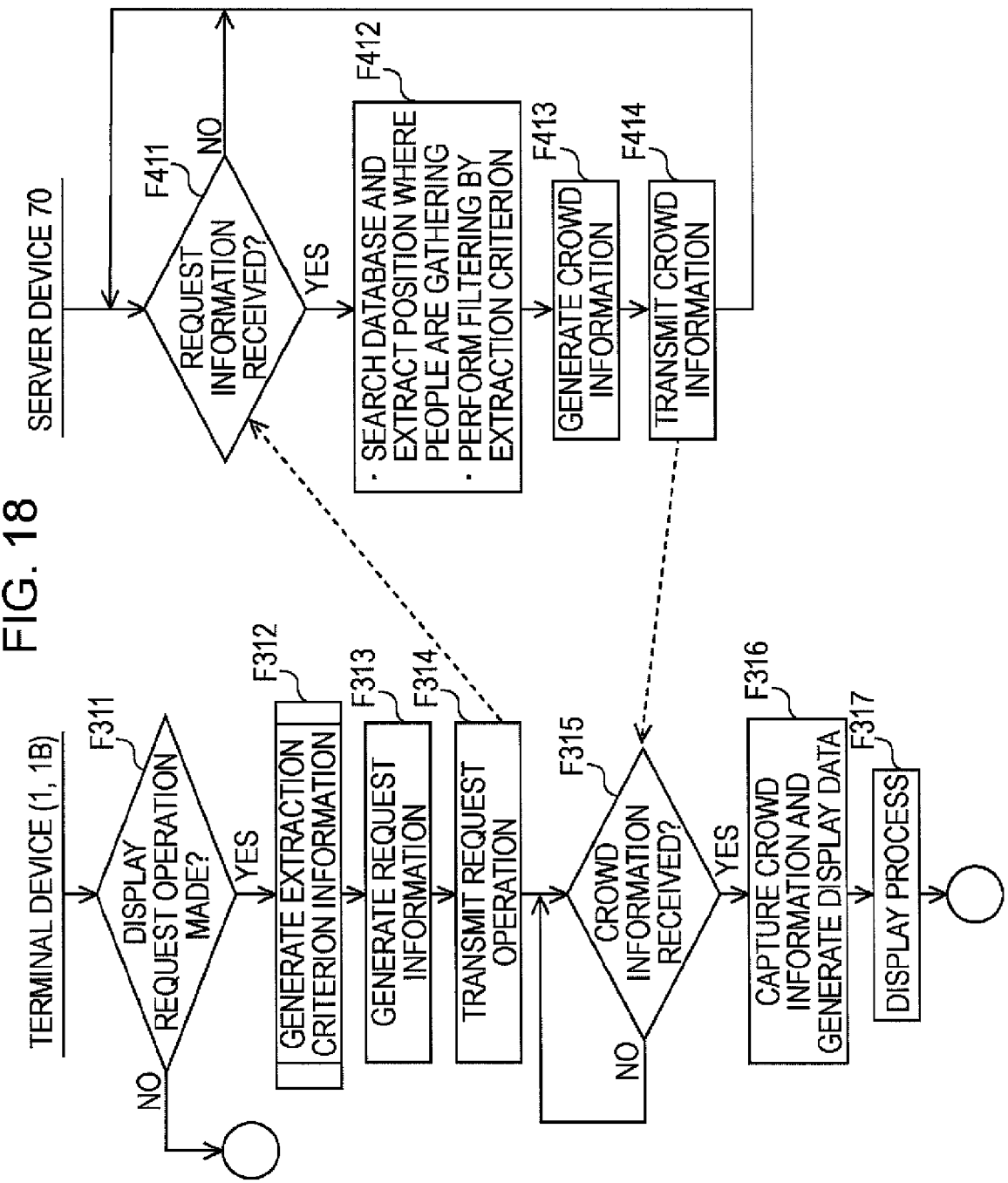
FIG. 18 is a flowchart of an operation example II for display of crowd information according to an embodiment of the present invention.

While the example of FIG. 18 mentioned above is directed to a case in which the user of the terminal device 1 specifies an extraction criterion, a case is also conceivable in which filtering based on a person's attribute is performed automatically on the server device 70 side. A user ID is included in request information from the terminal device 1, and on the server device 70 side, the registered user database 76 manages registered attribute information of the user of the terminal device 1. That is, the age, sex, and hobby/preference of the user of the terminal device 1 can be determined. This means that on the server device 70 side, with the age, sex, and hobby/preference of the user of the terminal device 1 as extraction criteria, a location where a large number of people with these attributes matching those of the user are gathering can be retrieved.

That is, the user of the terminal device 1 is able to know information on a location where people of the same sex, age bracket, and hobby/preference as his/her own are gathering.

Further, filtering by stay time is also conceivable.

For example, as extraction criterion information, the user of the terminal device 1 inputs a condition such as the stay time being 10 minutes or more. The terminal device 1 transmits request information as shown in FIGS. 16C and 16D to which the specified extraction criterion information has been added. On the server device 70 side, the stay time with respect to each user ID is managed on the registered user database 76, so user IDs with stay time of 10 minutes or more can be extracted. Then, a location where persons matching that extraction criterion are gathering is retrieved, and crowd information is generated.

Accordingly, the user of the terminal device 1 is able to know information such as a location where people who have been staying there for a long time are gathering.

Further, filtering by stay time may be performed on the server device 70 side without the user of the terminal device 1 specifying an extraction criterion. For example, there may be situations in which, although there are many people in such places as an intersection on the main street of a big city, or on the road near an event site, almost all of those people are moving. Thus, it is also effective to perform filtering in such a way that a person with short stay time is presumed to be not present at that location, and thus not included in the current head count for that position.

Next, filtering by person's condition is conceivable.

Examples of a person's condition includes biometric information, a psychological condition inferred from the biometric information, and a movement state indicated by motion information.

For example, in accordance with an extraction criterion "person who is excited", on the server device 70 side, filtering can be performed to extract people whose heart rates are equal to or higher than a predetermined value by referring to biometric information on the registered user database 76. Thus, as a result, the user of the terminal device 1 is able to know a location where excited people are gathering.

Likewise, by setting psychological states such as "person who is thrilled" and "person who is having fun" as extraction criteria, the user is also able to know a location where people matching these criteria are gathering.

Setting these criteria is particularly effective in a case where the user of the terminal device 1 wants to know a location where something interesting is happening.

Also, by setting motion information such as "person who is running" as an extraction criterion, the user is able to know a location where people matching this criterion are gathering.

Such biometric information and motion information may be specified by the user or automatically set on the server side as well.

For example, the user of the terminal device 1 inputs a condition such as "person who is excited" as extraction criterion information. The terminal device 1 transmits request information as shown in FIGS. 16C and 16D to which the specified extraction criterion information has been added. On the server device 70 side, a psychological state with respect to each user ID is managed on the registered user database 76, so user IDs corresponding to people who are excited can be extracted. Then, a location where persons matching that extraction criterion are gathering is retrieved, and crowd information is generated. Thus, the user of the terminal device 1 is able to know a location where people corresponding to an arbitrary biometric condition or the like, for example, people who are excited, are gathering.

Further, a user ID is included in request information from the terminal device 1, and on the server device 70 side, the registered user database 76 manages the latest updated information of the user of the terminal device 1. Thus, the current biometric information or motion information of the user of the terminal device 1 can be determined. Accordingly, on the server device 70 side, with a biometric condition, psychological condition, or motion condition similar to that of the user of the terminal device 1 as an extraction criterion, a location where many people matching the criterion are gathering can be retrieved.

That is, the user of the terminal device 1 is able to know information on a location where people who are in a condition or mood similar to his/her own are gathering.

Further, filtering by distribution condition of persons is also conceivable.

For example, on the server device 70 side, the distribution of persons can be grasped with respect to each of the positions P1, P2 . . . , from the head count management database 75 or the registered user database 76.

For example, it is possible to determine whether or not people who are gathering are concentrated in a specific age bracket, whether or not people of extremely diverse age brackets are gathering, and the like. Of course, the male/female ratio can be also checked.

Accordingly, it is possible to extract a location where no specific age bracket is predominant but people of diverse age brackets are gathering, a location where the males and females are in about the same ratio, and the like.

While examples of filtering have been described above, it is of course possible to perform filtering through a combination of these examples, and various other examples of filtering not described herein are also conceivable.

10. Display Examples

Through the above-mentioned operation examples I, II, and III for display of crowd information, in the terminal device 1, a display based on crowd information transmitted from the server device 70 side is made.

Now, examples of this display will be described.

FIGS. 20, 21, 22, and 23 each show an example of an image displayed on a display panel 14a in the display section 14 of the terminal device 1 or the terminal device 1B.

Figure 20:
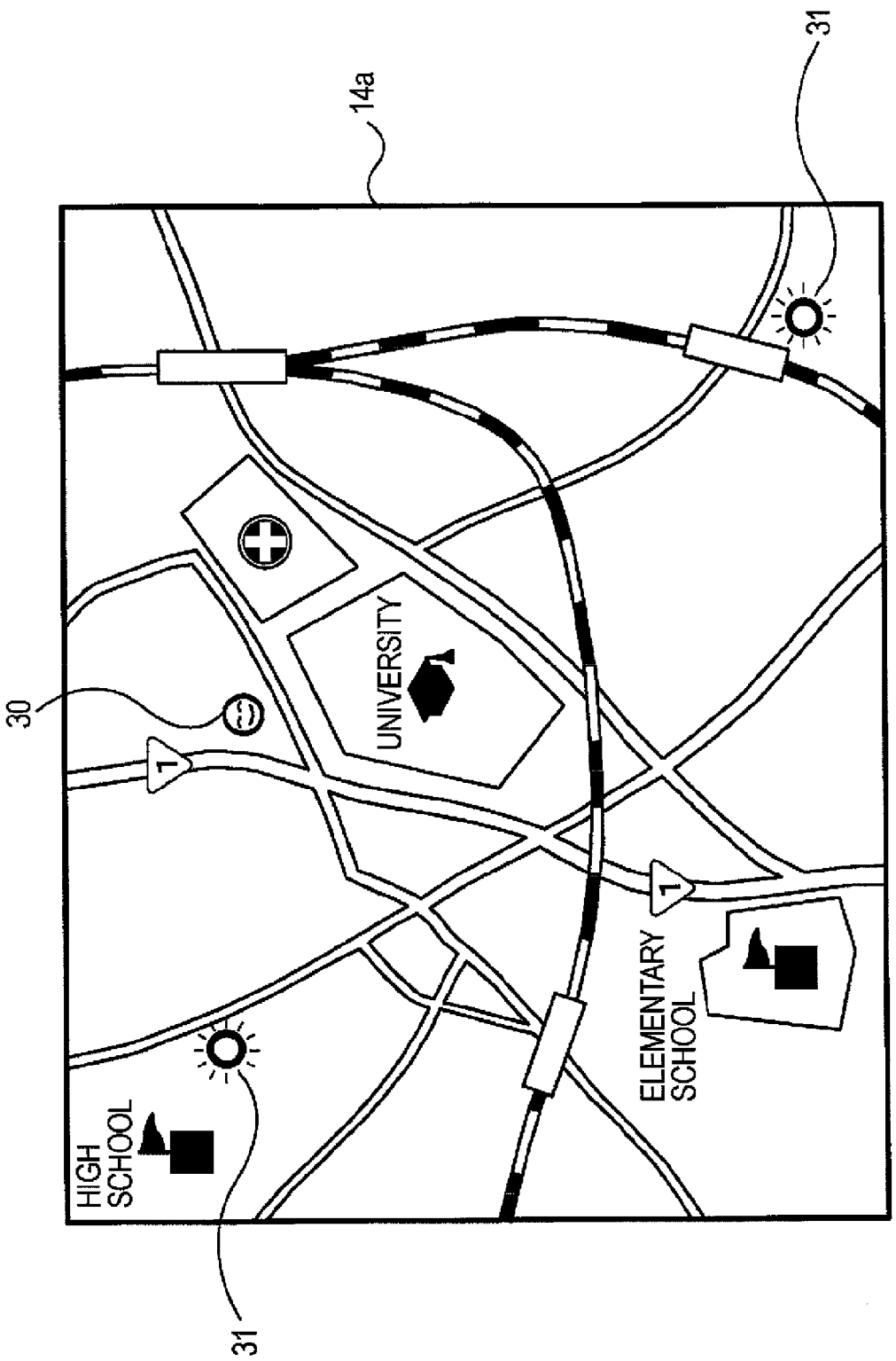
FIG. 20 is an explanatory view of a display example of crowd marks according to an embodiment of the present invention.

In the example of FIG. 20, a position corresponding to a "location where people are gathering" is presented on a map image by a crowd mark 31. Also, as a self-position display 30, the current position of the user of the terminal device 1 is presented by a character image or the like.

When the terminal device 1 receives crowd information from the server device 70, this means that the terminal device 1 has acquired position information indicative of a location where people are gathering, from crowd position information corresponding to one or a plurality of positions included in the crowd information. Thus, the system controller 10 can perform a map display on the basis of map drawing data read from the map database 17c, and can also cause the crowd mark 31 to be displayed at a point on a map indicated by the position information as shown in FIG. 20.

By performing a display in this way, the user of the terminal device 1 is able to know a location where people are gathering.

Further, through the self-position display 30 for the terminal device 1, the user can easily grasp the positional relation between the user's own position and the location where people are gathering.

It should be noted that there are various conceivable modes of displaying the crowd mark 31.

The crowd mark 31 may be represented by a mark of a predetermined shape, a character image, or the like, or may be displayed in such a way that the crowd mark 31 is changed in color or is made to flash as an indication of its position on a map.

Also, if crowd position information included in crowd information includes the current head count as shown in FIGS. 17C to 17F, a configuration is also conceivable in which the system controller 10 changes the size, color, or flashing speed of the crowd mark 31 in accordance with the current head count (or the number of increase or rate of increase). This allows the user to also able to know how many people are gathering.

Figure 21:
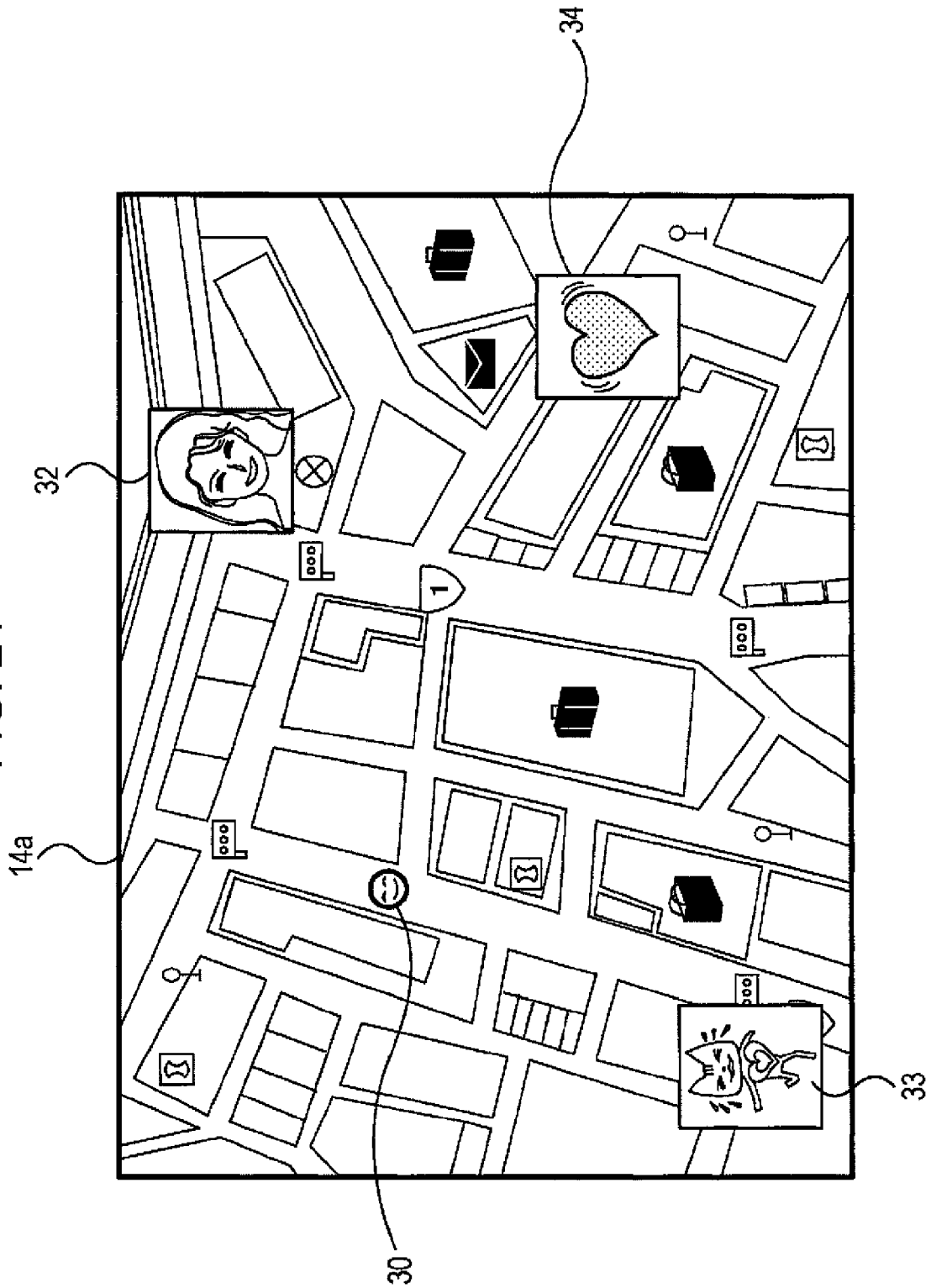
FIG. 21 is an explanatory view of a display example of crowd marks based on extraction criteria according to an embodiment of the present invention.

In the example of display in FIG. 21, when the above-described filtering is performed on the server device 70 side, a display is made in accordance with the extraction criterion used.

For example, if crowd position information included in crowd information includes an extraction criterion as shown in FIGS. 17E and 17F, at the time of presentation of a position indicated by the crowd position information, the system controller 10 can select a character image to be displayed in accordance with the extraction criterion.

For example, if the extraction criterion is "woman", as indicated by a crowd mark 32, a character image representing a woman is displayed.

Also, if the extraction criterion is "person who is running", as indicated by a crowd mark 33, a character image indicating a person who is running is displayed.

Also, if the extraction criterion is "person who is excited", as indicated by a crowd mark 34, a character image indicating a person who is excited is displayed.

Through display of these character images, the user of the terminal device 1 is also able to know what kinds of people are gathering.

It should be noted that the system controller 10 can perform the display as shown in FIG. 21 even when crowd position information included in the received crowd information does not include an extraction criterion as shown in FIGS. 17E and 17F. This is because, for example, when request information with an extraction criterion specified is transmitted from the terminal device 1 side as shown in FIG. 18, the system controller 10 stores the extraction criterion at the time of the display process in steps F316 and F317, the system controller 10 can select a character image corresponding to the extraction criterion.

Figure 22:
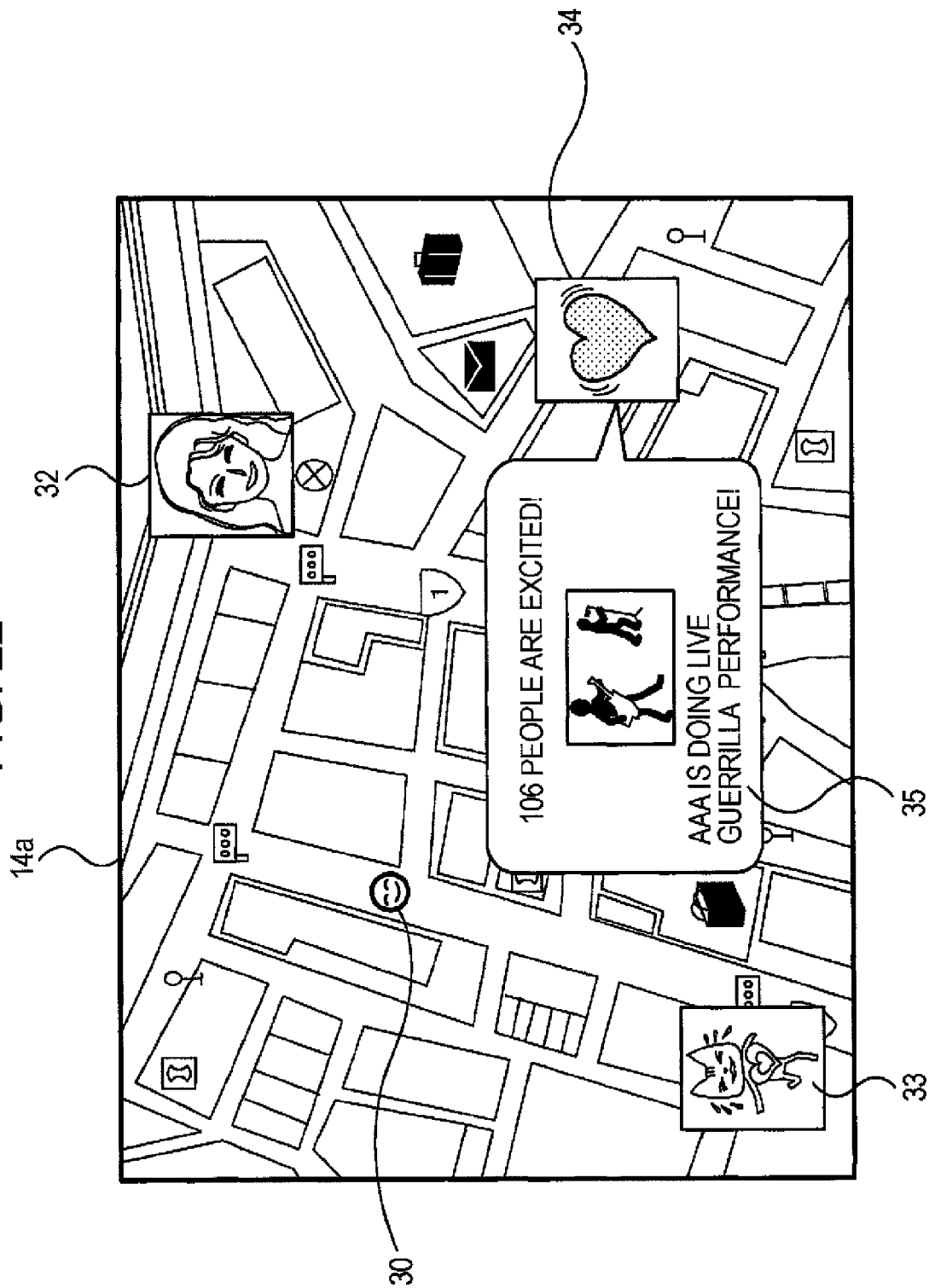
FIG. 22 is an explanatory view of a display example of crowd marks with additional information added thereto, according to an embodiment of the present invention.

FIG. 22 shows a display example for providing more detailed information to the user.

For example, suppose a case where the user performs an operation such as designating (for example, clicking on) the crowd mark 34 when the display as shown in FIG. 21 mentioned above is made.

In this case, the system controller 10 can execute additional information display 35 related to the crowd mark 34 with respect to the user.

Of course, if additional information can be acquired without a user's operation, the system controller 10 may automatically execute the additional information display 35 as shown in FIG. 22.

For example, if crowd position information includes a position attribute and position-associated service data as shown in FIG. 17F, in the system controller 10, additional information as a position attribute and position-associated service is acquired in association with a position indicated by the crowd position information. Accordingly, as shown in FIG. 22, the execution of a display based on a position attribute and position-associated service can be controlled in accordance with a user's operation.

The position attribute is, for example, a place name, a location name, a facility name, a road name, or a facility kind, and position-associated service data is an URL related to a point corresponding to the position, a store's advertisement, business information, image, discount information, or photograph image or comment as data posted by a general user. The system controller 10 can execute the additional information display 35 in accordance with these pieces of information.

For example, suppose a case where a person who is present at the location of the crowd mark 34 has come across a live street performance of an artist "AAA", and is posting a captured image of the performance and comment to the server device 70 side.

At this time, the crowd information to be sent to the terminal device 1 that is present at the location indicated by the self-position display 30 in the drawing is received while having this captured image, and comment data such as "AAA is doing a live guerrilla performance!" included in the position-associated service data. At this time, the system controller 10 can cause the additional information display 35 as shown in FIG. 22 to be executed automatically, or in response to a user's operation.

It should be noted that a configuration is also possible in which such additional information (position attribute and position-associated service data) is not transmitted/received while being included in crowd position information, but when, for example, the user performs an operation of designating the crowd mark 34, the system controller 10 controls communication access to the server device 70, and requests the server device 70 to transmit additional information.

It should be noted that the additional information display 35 may not necessarily be one based on the position attribute or position-associated service data provided from the server device 70. For example, in the example of FIG. 22, a text "106 people are excited!" is displayed. If crowd position information includes a current head count and an extraction criterion as shown in FIGS. 17D and 17E, the system controller 10 can create text data as a description of the position information. That is, if the current head count is 106, and the extraction criterion is "person who is excited", the system controller 10 generates the above-mentioned text data, and can display this text data as the additional information display 35.

FIG. 23 is an example of display based on the crowd inevitability level. For example, a case is assumed in which crowd marks 34A and 34B are displayed on the basis of crowd information that is transmitted from the server device 70 as a result of filtering according to an extraction criterion "person who is excited". In this case, it is assumed that crowd position information in the crowd information includes information on the crowd inevitability level as shown in FIG. 17D.

As described above, from the viewpoint of whether or not an accidental incident is happening at a given location, even when people are gathering at a location with high crowd inevitability level, this information is not very valuable for the user. On the other hand, if people are gathering at a location with low crowd inevitability level, that information is valuable information.

For example, the position indicated by the crowd mark 34B in FIG. 23 is a concert hall or the like, whereas the position indicated by the crowd mark 34A is just some street.

In this case, on the position management database 78 in the server device 70, a high crowd inevitability level is set with respect to the position of the crowd mark 34B, whereas a low crowd inevitability level is set with respect to the position of the crowd mark 34A. Then, the crowd inevitability levels are added to the gathering position information and transmitted to the terminal device 1.

The system controller 10 of the terminal device 1 can change the display size in accordance with the crowd inevitability level. That is, the lower the crowd inevitability level of a location, the more valuable is the information that people are gathering there, so the location is indicated by the larger crowd mark 34A as shown in the drawing, and a location with high crowd inevitability level is indicated by the small crowd mark 34B.

Thus, the user can determine the degree of gathering of people in the sense whether the gathering is due to an accidental incident.

While the size of the crowd mark 34 is changed in this example, the degree of inevitability may be expressed by the color of the crowd mark 34, its flashing speed, or the like.

Further, while in this example the display size or the like is changed in accordance with the crowd inevitability level included in crowd information received by the system controller 10, the system controller 10 may also determine the crowd inevitability level in accordance with the facility kind or the like that can be grasped from the map database 17c, and select a display mode. For example, if it can be grasped from the map database 17c that a position for making a notification display in accordance with crowd information is a concert hall, a sport stadium, or the like, it is determined that the crowd inevitability level is high at the location.

While examples of display have been illustrated above, there are various other conceivable display modes for presenting a location where people are gathering.

Also, when displaying a map, it is common to change the scale of the map. In this regard, it is also appropriate to change the upper limit for the number of notification displays of locations where people are gathering, in accordance with the scale.

11. Effect of Embodiment and Modifications

According to the embodiment described above, the user of the terminal device 1 (1B) is able to know an incident, an event, or the like that the user would not normally be able to know unless he/she were on the scene, as information on a location where people are gathering. This makes it possible to provide very useful information to the user.

Further, a display that expresses not simply a gathering of people but also information such as what kinds of people are gathering, about how many people are gathering, and the like is made, which also proves suitable for the user to judge whether or not an incident that is happening at that location is of interest to the user. It is thus possible to provide appropriate information to the user.

In the case of the operation example I for display of crowd information in FIG. 15 mentioned above, when the user of the terminal device 1 wants to know information about a location where people are gathering, the user can obtain that information.

Also, in the case of the operation example II for display of crowd information in FIG. 18 mentioned above, when the user of the terminal device 1 wants to know information about a location where people matching a specific extraction criterion are gathering, the user can obtain that information.

Also, in the case of the operation example III for display of crowd information in FIG. 19 mentioned above, the user of the terminal device 1 is notified of information about a location where people are gathering, in accordance with changes in condition of the location where people are gathering, so the user is easily able to know a location where an accidental incident is happening.

The present invention is not limited to the above-mentioned embodiments, but various modifications of device configuration or processing are conceivable.

The above-described configuration of each of the terminal device 1, 1A, 1B, and server device 70 is merely an example, and various additions or deletions of components are of course conceivable in accordance with the operation example or function actually implemented.

For example, while the terminal device 1, 1B is configured to include the display section 14, the display section may not be provided, and a display may be executed by using a separate display device.

While in the above-mentioned embodiment individual management of each terminal device 1 is performed on the server device 70 side by using a user ID, a system operation that does not use information for identifying a user or terminal device, such as a user ID, is also conceivable.

That is, in this case, no user ID or the like is included in current condition information transmitted from the terminal device 1, 1A, and the server device 70 performs management of only the head count with respect to each of the positions P1, P2 . . . , simply on the basis of current condition information. Then, on the basis of the head count management, crowd information is generated and transmitted to an unspecified terminal device 1, 1B.

It should be understood by those skilled in the art that various modifications, combinations, sub-combinations and alterations may occur depending on design requirements and other factors insofar as they are within the scope of the appended claims or the equivalents thereof.

What is claimed is:

1. An information provision system comprising:
a terminal device; and
an information provision device that can communicate with the terminal device,
wherein the information provision device is configured to:
communicate with the terminal device,
manage current head count information for a plurality of positions, the current head count information being determined based at least in part upon information received from the terminal device,
determine a first position of the plurality of positions for which a notification display is generated, based on the current head count information, and generate crowd information including information regarding the first position, and
cause the crowd information to be transmitted to the terminal device, and wherein the terminal device is configured to:
communicate with the information provision device, and
execute a display of a map image on an integrated or separate display section, and execute on the map image a display based on biometric information and crowd information, the biometric information being associated with the crowd information, the crowd information being transmitted from the information provision device and received by the terminal device, wherein the map image indicates a type of event associated with the crowd information, and wherein the biometric information is used to display on the integrated or separate display section a psychological state of a crowd comprising at least one person.

2. An information provision device comprising:
a communicating section for communicating with an external terminal device;

a head count information managing section for managing current head count information for a plurality of positions, the current head count information being determined based at least in part upon information received from the external terminal device; and a server control section for determining a first position of the plurality of positions for which a notification display is generated, based on biometric information and the current head count information managed by the head count information managing section, and generating crowd information including information regarding the first position, the server control section causing the crowd information and information that indicates a type of event associated with the crowd information to be transmitted from the communicating section to the external terminal device, wherein the biometric information is used to display a psychological state of a crowd comprising at least one person.

3. The information provision device according to claim 2, wherein the server control section determines the first position by determining whether or not a current head count at each of the plurality of positions is equal to or more than a predetermined head count, from the head count information managed by the head count information managing section.

4. The information provision device according to claim 2, wherein the server control section determines the first position by determining whether or not an amount of change in head count is equal to or more than a predetermined amount of change, from the head count information managed by the head count information managing section.

5. The information provision device according to claim 2, wherein:

the communicating section receives current condition information transmitted from the external terminal device and including at least current position information of the terminal device; and the head count information managing section manages the current head count information by using the received current condition information.

6. The information provision device according to claim 5, wherein:

the current condition information also includes identification information on the terminal device side; and the head count information managing section manages information of a person present at one or more of the plurality of positions based on the identification information.

7. The information provision device according to claim 6, wherein:

the current condition information includes the biometric information; and the head count information managing section manages the biometric information as the information of a person present, together with the identification information.

8. The information provision device according to claim 6, wherein the head count information managing section manages attribute registration information of a person who uses the terminal device, in association with the identification information.

9. The information provision device according to claim 6, wherein the head count information managing section manages stay time at a current position in association with the identification information, as the information of a person present.

10. The information provision device according to claim 3, wherein when determining whether or not the current head count is equal to or more than a predetermined head count, the server control section makes the determination based on setting a different value of the predetermined head count for each of the plurality of positions, to determine the first position.

11. The information provision device according to claim 3, wherein the server control section determines the first position by determining whether or not the current head count within a specific area range is equal to or more than a predetermined head count.

12. The information provision device according to claim 3, wherein the server control section determines the first position by determining, as the current head count for each of the plurality of positions, a current head count of persons who match a predetermined extraction criterion, and determining whether or not the determined current head count is equal to or more than a predetermined head count.

13. The information provision device according to claim 12, wherein the extraction criterion includes at least one of person's attribute registration information, biometric information, motion information, and stay time.

14. The information provision device according to claim 3, wherein the server control section determines the first position where a current head count is equal to or more than a predetermined head count, and in accordance with distribution of attribute information of persons present.

15. The information provision device according to claim 4, wherein when determining whether or not the amount of change in current head count is equal to or more than a predetermined head count, the server control section sets a different value of the reference amount of change for each of the plurality of positions.

16. The information provision device according to claim 4, wherein the server control section determines the first position by determining whether or not the amount of change in current head count within a specific area range is equal to or more than a reference amount of change.

17. The information provision device according to claim 4, wherein the server control section determines the first position by determining a current head count of persons who match a predetermined extraction criterion at each of the plurality of positions, and determining whether or not an amount of change in the determined current head count is equal to or more than a reference amount of change.

18. The information provision device according to claim 17, wherein the extraction criterion includes at least one of a person's attribute, registration information, biometric information, motion information, and stay time.

19. The information provision device according to claim 3, wherein the server control section determines the first position where an amount of change in head count is equal to or more than a reference amount of change, and in accordance with distribution of attribute information of persons present.

20. The information provision device according to claim 2, wherein the server control section generates crowd information including information of the first position, and information of a current head count or an amount of change in head count at the first position.

21. The information provision device according to claim 2, wherein the server control section generates crowd information including information of the first position, and information of an extraction criterion used when determining the first position.

22. The information provision device according to claim 2, wherein the server control section generates crowd information including information of the first position, and additional information for the first position.

23. The information provision device according to claim 2, wherein the server control section causes the crowd information to be transmitted from the communicating section to the external terminal device, in response to reception of request information from the external terminal device.

24. The information provision device according to claim 2, wherein the server control section causes the crowd information to be transmitted from the communicating section to the terminal device, at a transmission timing according to a change in head count condition.

25. An information provision method comprising steps of:
managing current head count information for a plurality of positions, the current head count information being determined based at least in part upon information received from external terminal devices;
determining a first position of the plurality of positions for which a notification display is generated, based on biometric information and the current head count information, and generating crowd information including information of the first position, wherein the biometric information is used to display a psychological state of a crowd comprising at least one person; and
transmitting the crowd information and information that indicates a type of event associated with the crowd information to at least one of the external terminal devices.

26. A terminal device comprising:
a communicating section for communicating with an external information provision device, wherein the communicating section is configured to send information regarding a position of the terminal device to the external information provision device; and
a controller for executing a display of a map image on an integrated or separate display section, and executing on the map image a display based on biometric information and crowd information, the biometric information being associated with the crowd information, the crowd information being transmitted from the external information provision device and received by the communicating section and includes position information of a position determined based on head count information, wherein the map image indicates a type of event associated with the crowd information, and wherein the biometric information is used to display a psychological state of a crowd comprising at least one person.

27. The terminal device according to claim 26, wherein:
the crowd information includes the position information of the first position, and information of a current head count or an amount of change in head count at the first position; and
the controller executes, as the display based on the crowd information, a display that varies in accordance with the current head count or the amount of change in head count, at a location on the map image corresponding to the position information.

28. The terminal device according to claim 26, wherein:
the crowd information includes the position information of the first position, and information of an extraction criterion used when determining the first position; and
the controller executes, as the display based on the crowd information, a display that varies in accordance with the extraction criterion, at a location on the map image corresponding to the position information.

29. The terminal device according to claim 26, wherein:
the crowd information includes the position information of the first position, and additional information with respect to the first position; and
the controller executes a display based on the additional information as the display based on the crowd information, at a location on the map image corresponding to the position information.

30. A display method for a terminal device that can communicate with an external information provision device, comprising steps of:
receiving crowd information including position information of a first position, from the external information provision device, the crowd information being determined based at least in part upon information received from a plurality of terminal devices; and
executing a display of a map image on an integrated or separate display section based on biometric information and the crowd information, wherein the map image indicates a type of event associated with the crowd information, and wherein the biometric information is used to display on the integrated or separate display section a psychological state of a crowd comprising at least one person.

31. An information provision system comprising:
a terminal device; and
an information provision device that can communicate with the terminal device,
wherein the information provision device includes
a communicating section configured to communicate with the terminal device;
a head count information managing section configured to manage current head count information for a plurality of positions, the current head count information being determined based at least in part upon information received from the terminal device;
a crowd information generating section configured to determine a first position for which a notification display is generated, based on the current head count information managed by the head count managing section, and generate crowd information including information of the first position, and
a transmission control section configured to cause the crowd information generated by the crowd information generating section to be transmitted from the communicating section to the terminal device, and
wherein the terminal device includes
a communicating section configured to communicate with the information provision device, and
a control section configured to execute a display of a map image on an integrated or separate display section, and execute on the map image a display based on biometric information and crowd information, the biometric information being associated with the crowd information, the crowd information being transmitted from the information provision device and received by the communicating section, wherein the map image indicates a type of event associated with the crowd information, and wherein the biometric information is used to display on the integrated or separate display section a psychological state of a crowd comprising at least one person.

32. An information provision device comprising:
a communicating section configured to communicate with an external terminal device;
a head count information managing section configured to manage current head count information for a plurality of positions, the current head count information being determined based at least in part upon information received from the external terminal device;

a crowd information generating section configured to determine a first position of the plurality of positions for which a notification display is generated, based on biometric information and the current head count information managed by the head count managing section, and generate crowd information including information of the first position, wherein the biometric information is used to display a psychological state of a crowd comprising at least one person; and a transmission control section configured to cause the crowd information generated by the crowd information generating section and information that indicates a type of event associated with the crowd information to be transmitted from the communicating section to the external terminal device.

33. A terminal device comprising:

a communicating section configured to communicate with an external information provision device, wherein the communicating section is configured to send information regarding a position of the terminal device to the external information provision device; and a control section configured to execute a display of a map image on an integrated or separate display section, and execute on the map image a display based on crowd information that is transmitted from the external information provision device and received by the communicating section, the crowd information including position information of a position for which a notification display is generated, the position for which a notification display is generated being determined based on head count information and biometric information, wherein the map image indicates a type of event associated with the crowd information, and wherein the biometric information is used to display on the integrated or separate display section a psychological state of a crowd comprising at least one person.

* * * * *